US010581978B2

(12) United States Patent
Border

(10) Patent No.: US 10,581,978 B2
(45) Date of Patent: Mar. 3, 2020

(54) SMART SPOOFING TO IMPROVE SPOOFING PERFORMANCE WHEN RESOURCES ARE SCARCE

(71) Applicant: Hughes Network Systems, LLC, Germantown, MD (US)

(72) Inventor: John Border, Germantown, MD (US)

(73) Assignee: HUGHES NETWORK SYSTEMS, LLC, Germantown, MD (US)

(*) Notice: Subject to any disclaimer, the term of this patent is extended or adjusted under 35 U.S.C. 154(b) by 312 days.

(21) Appl. No.: 15/665,331

(22) Filed: Jul. 31, 2017

(65) Prior Publication Data

US 2019/0037029 A1    Jan. 31, 2019

(51) Int. Cl.

| H04L 29/08 | (2006.01) |
|---|---|
| H04L 12/927 | (2013.01) |
| H04L 12/26 | (2006.01) |
| H04L 29/06 | (2006.01) |
| H04W 80/06 | (2009.01) |
| H04L 12/893 | (2013.01) |
| H04W 28/02 | (2009.01) |

(52) U.S. Cl.
CPC ........ *H04L 67/141* (2013.01); *H04L 43/0829* (2013.01); *H04L 47/40* (2013.01); *H04L 47/803* (2013.01); *H04L 67/1078* (2013.01); *H04L 67/2876* (2013.01); *H04L 69/163* (2013.01); *H04W 80/06* (2013.01); *H04L 69/161* (2013.01); *H04W 28/0242* (2013.01)

(58) Field of Classification Search
CPC .. H04L 67/141; H04L 43/0829; H04L 69/161

USPC ........................................................ 709/228
See application file for complete search history.

(56) References Cited

U.S. PATENT DOCUMENTS

| 2002/0010792 A1* | 1/2002 | Border ............... H04B 7/18582 709/238 |
|---|---|---|
| 2009/0109849 A1 | 4/2009 | Wood |
| 2009/0316719 A1 | 12/2009 | Baron |

FOREIGN PATENT DOCUMENTS

EP    1176788    1/2002

OTHER PUBLICATIONS

Deering, RFC 1112, Aug. 1989, ietf.org (17 pages).*
Ishac, On the Performance of TCP Spoofing in Satellite Networks, 2001, IEEE (5 pages).*

(Continued)

*Primary Examiner* — Wing F Chan
*Assistant Examiner* — Leon Y Tseng
(74) *Attorney, Agent, or Firm* — Sheppard, Mullin, Richter & Hampton LLP

(57) ABSTRACT

Systems and methods described herein are directed to techniques for selective TCP spoofing of a TCP connection between a first and a second host based on spoofing resource conditions and characteristics of the hosts involved in the TCP connection. In implementations, spoofing resource conditions may be based on a percentage of available resources in use by each of a TCP spoofer and a TCP spoofer peer. In implementations, characteristics of the hosts may be determined by tracking i) each TCP connection application type seen for each host over a time window; and ii) packet loss conditions of local hosts over a time window.

59 Claims, 14 Drawing Sheets

(56) References Cited

OTHER PUBLICATIONS

Murase T et al: "Overlay Network Technologies for QOS Control", IEICE Transactions on Communications, Communications Society, Tokyo, JP, vol. E89B, No. 9, Sep. 2006 (Sep. 2006), pp. 2280-2291, XP001501545, ISSN: 0916-8516, DOI: 10.1093/IETCOM/E89-8.9.2280 section 4.4.
International Search Report and Written Opinion for International Application No. PCT/US18/43780, dated Oct. 26, 2018 (16 pages).

* cited by examiner

| Rule Order | Rule Name | Static Classifiers ||||||| Linkage | Combined Conditions |||||| Action ||| 
|---|---|---|---|---|---|---|---|---|---|---|---|---|---|---|---|---|---|---|
| | | IP Protocol Version(s) | IP Subnet(s) || Protocol Type | Port Number(s) || | | Dominant Host Application | Conditional Linkage | Packet Loss Level | Conditional Linkage | Resource Use Level | | Spoof the Connection? | Spoof the 3-way Handshake? | Assigned Class of Service |
| | | | Source | Destination | | Source | Destination | | | | | | | | | | | |
| 1 | HTTP | IPv4 and IPv6 | Any | Any | TCP | Any | 80 | | | Any | AND | Any | AND | Any | | Yes | Yes | 2 |
| 2 | HTTPS | IPv4 and IPv6 | Any | Any | TCP | Any | 443 | | | Any | AND | Any | AND | Any | | Yes | Yes | 1 |
| 3 | Default | IPv4 and IPv6 | Any | Any | TCP | Any | Any | | | Any | AND | Any | AND | >98% | | No | N/A | 4 |
| 4 | FTP Data | IPv4 and IPv6 | Any | Any | TCP | Any | 20 | | | Any | AND | Low | AND | >90% | | No | N/A | 4 |
| 5 | FTP Data | IPv4 and IPv6 | Any | Any | TCP | Any | 20 | AND | | Any | AND | Any | AND | Any | | Yes | No | 4 |
| 6 | FTP Control | IPv4 and IPv6 | Any | Any | TCP | Any | 21 | | | Any | AND | Any | AND | <80% | | Yes | Yes | 4 |
| 7 | FTP Control | IPv4 and IPv6 | Any | Any | TCP | Any | 21 | | | Any | AND | Any | AND | Any | | No | N/A | 4 |
| 8 | Telnet | IPv4 and IPv6 | Any | Any | TCP | Any | 23 | | | Any | AND | Any | AND | <80% | | Yes | Yes | 3 |
| 9 | Telnet | IPv4 and IPv6 | Any | Any | TCP | Any | 23 | | | Any | AND | Any | AND | Any | | No | N/A | 3 |
| 10 | Default | IPv4 and IPv6 | Any | Any | TCP | Any | Any | | | Interactive | AND | Any | AND | >94% | | Yes | Yes | 4 |
| 11 | Default | IPv4 and IPv6 | Any | Any | TCP | Any | Any | | | Any | AND | Any | AND | Any | | Yes | Yes | 4 |

FIG. 4B

SMART SPOOFING TO IMPROVE SPOOFING PERFORMANCE WHEN RESOURCES ARE SCARCE

TECHNICAL FIELD

The present disclosure relates generally to TCP spoofing. More particularly, some embodiments of the present disclosure are directed toward systems and methods for selective TCP spoofing based on spoofing resource conditions and characteristics of hosts involved in a connection.

BACKGROUND

The transmission control protocol (TCP) is a widely used protocol in the Internet protocol suite. Conceptually, it is a part of the transport layer in the network stack in the Internet Protocol Suite. The TCP provides a reliable stream of data between applications running on hosts communicating over an IP network. Key functions performed by the TCP include dividing the data passed to it from the application layer into appropriately sized chunks for the network layer, acknowledging received packets, setting timeouts to make certain the other end acknowledges packets that are sent, and so forth. TCP is used for data transfer in a variety of applications including file transfer, the World Wide Web, data streaming, email, and so forth.

A TCP connection is established between a sender and receiver using a three-way or 3-step handshake. During this process, full-duplex communication is established by: i) the sender transmitting a TCP segment with a Synchronize Sequence Number (SYN); ii) the receiver sending an acknowledge (ACK) message to the sender's SYN containing the receiver's SYN (i.e., a SYN+ACK message); and iii) the sender sending an ACK to the receiver's SYN.

Once a TCP connection is established, data is transferred between devices using a sliding window acknowledgement system. The TCP transmitter includes sequence numbers in the data it sends. The TCP receiver uses the sequence numbers to acknowledge data segments it has received. The rate at which a TCP transmitter can send data to a TCP receiver is limited by a send window that defines a maximum number of unacknowledged bytes the transmitter is allowed to have at a time. As the TCP transmitter receives acknowledgments, transmitted data may be reclassified from "sent and unacknowledged" to "sent and acknowledged," which permits the send window to "slide" to send more data. If a data segment is lost in transit, the TCP transmitter will not receive an acknowledgement for the segment and will retransmit it.

The TCP transmitter dynamically adjusts the size of the window based on network conditions, but the window has an upper bound determined by the TCP receiver's advertised available buffer space. The TCP throughput possible with a particular window size is determined by the rate at which acknowledgments are received. With any particular window size, longer acknowledgment time means lower throughput. The time it takes for TCP data to be acknowledged is known as the TCP round trip time (RTT).

Although TCP was designed to be flexible and work over a wide variety of communication links, the throughput possible across the TCP connection is affected by the characteristics of the link in which it is used. In particular, TCP protocol throughput performance may suffer in environments with high packet loss and high latency. An example of such an environment is an environment that includes a high latency link, such as a geosynchronous satellite link. Inherently, there will be about a 125 ms delay for data packets to travel at the speed of light from the earth's surface to a satellite positioned above the equator. Altogether, this creates a minimum RTT between transmitter and receiver of a data session of at least 500 ms. However, the TCP protocol was designed for use on terrestrial networks having a substantially shorter average latency.

A class of methods for improving the performance of TCP sessions over high latency environments (e.g., satellite links) involve Performance Enhancing Proxies (PEPs), which are techniques that change the TCP header data before and after the high latency link (e.g., satellite link) in order to mask the high latency of the high latency link from the TCP session. One PEP technique is TCP spoofing, which involves an intermediate network device (e.g., a satellite modem/router at the customer side or a device at the satellite carrier's Network Operations Center) imitating a TCP session by sending locally generated TCP packet acknowledgments. FIG. 1 illustrates an example implementation of TCP spoofing in a satellite network. As illustrated, in such an implementation, the spoofing device (in this example, a router) locally acknowledges receipt of a data packet from a sender (e.g., a client computer or server) as if it were the receiver. The local acknowledgments reduce the RTT perceived by the TCP sender, allowing the TCP sender to transmit data more quickly, thereby improving throughput.

TCP spoofing introduces the following benefits for a TCP connection. First, it speeds up the TCP connection set-up by spoofing the TCP three-way handshake to hide the high latency (e.g. satellite) resulting from the RTT of the connection setup process. Second, it speeds up transmit window growth to increase throughput significantly faster. Third, it provides recovery from packets lost between the remote host and the terminal and/or between the IP Gateway and the Internet host using low latency (i.e, terrestrial) RTTs, again hiding the high (e.g. satellite) round trip latency. Additionally, it provides recovery from packets lost between the terminal and the IP Gateway transparently to the end hosts (i.e. without causing changes to the TCP connection congestion window).

In order to implement TCP spoofing, the spoofing device utilizes memory resources (e.g., a storage buffer) to store data segments until they are acknowledged across the link and allow for the retransmission of data segments for which no acknowledgement is received. However, the memory resources available to a TCP spoofer are finite. At some point, it becomes impossible to spoof a new TCP connection because of the number of TCP connections already being spoofed. This problem is avoided (but not solved) by throwing more resources at the TCP spoofer. But, there are platform specific limits as to how far this can be taken. When no resources are available for a new TCP connection, the connection must be forwarded unspoofed, without mitigation for the challenging elements of the environment.

Original TCP spoofing implementations allocated TCP spoofing resources (i.e., buffer space, connection control blocks, etc.) dynamically as TCP connections were established and detected by the TCP spoofing gateway, without taking into account the type of application using the TCP connection. In such implementations, all TCP connections, regardless of whether or not they will benefit from spoofing (i.e., will benefit from the high throughput), are spoofed up until all the TCP spoofing resources have been allocated. Any additional TCP connections which are detected must pass through unspoofed, even if they are associated with applications which require high throughput.

More recently, selective TCP spoofing has been implemented using classification rules. However, in such implementations, classification rules are statically applied at all times, ignoring both host characteristics and spoofing resource availability. These classification rules are aimed at never spoofing certain types of applications irrespective of TCP spoofing resource availability.

SUMMARY

Techniques described herein are directed to selective TCP spoofing based on spoofing resource conditions and characteristics of hosts involved in a connection.

In a first embodiment, a method includes: receiving, at a TCP spoofer, a message from a local host including a request to initiate a TCP connection with a remote host; determining from the message an IP address of the local host; based on the determined IP address of the local host, determining: characteristics of applications in use by the local host over a time window or packet loss conditions of the local host over the time window; determining spoofing resource conditions of the TCP spoofer; and determining at the TCP spoofer whether to spoof the TCP connection from the local host to the remote host using at least: the determined spoofing resource conditions of the TCP spoofer; and the characteristics of applications in use by the local host over the time window or the packet loss conditions of the local host over the time window. In particular implementations, the method may be implemented by a satellite terminal or an IP Gateway.

In implementations, the method further includes: determining spoofing resource conditions of a TCP spoofer peer associated with the remote host, where the determination of whether to spoof the TCP connection from the local host to the remote host uses the determined spoofing resource conditions of the TCP spoofer peer. In this implementation, determining spoofing resource conditions of the TCP spoofer and the TCP spoofer peer may include determining a percentage of available resources in use by each of the TCP spoofer and the TCP spoofer peer. In a particular implementation, determining spoofing resource conditions of the TCP spoofer and the TCP spoofer peer includes calculating an effective connection control block (CCB) resource percentage in use.

In implementations, the method includes: determining the packet loss conditions of the local host over the time window, where the packet loss conditions are determined by computing a packet loss level value based on a number of packets lost by the local host during the time window divided by a total number of packets transmitted by the local host during the time window, where the determination of whether to spoof the TCP connection uses the packet loss level value.

In implementations, the method includes determining characteristics of applications in use by the local host over a time window, where determining characteristics of applications in use by the local host over the time window includes classifying each TCP connection application type seen for the local host over the time window and counting a number of application types of each TCP connection application type seen. In this implementation, determining characteristics of applications in use by the local host over the time window may include: determining a most frequently used application type by the local host over the time window.

In implementations, the method may further include: determining from the message an IP address of the remote host; and based on the determined IP address of the remote host, determining characteristics of applications in use by the remote host over a time window. By way of example, determining characteristics of applications in use by the remote host over the time window may include: classifying each TCP connection application type seen for the remote host over the time window; counting a number of application types of each TCP connection application type seen for the remote host; and determining a most frequently used application type by the remote host over the time window.

In implementations, the method further includes: spoofing the TCP connection, including the three-way handshake of the TCP connection. In another implementation, the method further includes: spoofing the TCP connection, not including the three-way handshake of the TCP connection. In yet another implementation, the method further includes: making a determination that the TCP connection should not be spoofed using at least the determined spoofing resource conditions of the TCP spoofer and TCP spoofer peer; and forwarding the TCP connection unspoofed.

In implementations, the TCP spoofer and TCP spoofer peer are each a component of a satellite terminal or an IP Gateway. In some implementations, the remote host is an internet host.

In one embodiment, a method includes: receiving, at a TCP spoofer, a message from a local host including a request to initiate a TCP connection with a remote host; determining spoofing resource conditions of the TCP spoofer; determining spoofing resource conditions of a TCP spoofer peer associated with the remote host; and determining at the TCP spoofer whether to spoof the TCP connection from the local host to the remote host by querying a plurality of spoofing rules, where at least one of the queried spoofing rules includes a condition based on the determined spoofing resource conditions of the TCP spoofer and the TCP spoofer peer.

In implementations, determining spoofing resource conditions of the TCP spoofer and the TCP spoofer peer may include determining a percentage of available resources in use by each of the TCP spoofer and the TCP spoofer peer. In a particular implementation, determining spoofing resource conditions of the TCP spoofer and the TCP spoofer peer includes calculating an effective connection control block (CCB) resource percentage in use. In another particular implementation, determining spoofing resource conditions of the TCP spoofer and the TCP spoofer peer comprises determining a percentage of available buffer space in use by each of the TCP spoofer and the TCP spoofer peer.

In implementations, determining spoofing resource conditions of the TCP spoofer peer includes receiving a packet multicast by the IP Gateway, where the packet includes information on the IP Gateway's resource usage.

In one embodiment, a method includes: receiving, at a TCP spoofer, an IP message from a local host including a request to initiate a TCP connection with a remote host; determining from the IP message an IP address of the local host and an IP address of the remote host; based on the determined IP address of the local host, determining characteristics of applications in use by the local host over a first time window; based on the determine IP address of the remote host, determining characteristics of applications in use by the remote host over a second time window; and determining at the TCP spoofer whether to spoof the TCP connection from the local host to the remote host by querying a plurality of spoofing rules, where at least one of the queried spoofing rules includes a condition based on the determined characteristics of applications in use by the local host over the first time window and the determined characteristics of applications in use by the remote host over the second time window.

In implementations, determining characteristics of applications in use by the local host over a first time window includes classifying each TCP connection application type seen for the local host over the first time window and counting a number of application types of each TCP connection application type seen over the first time window.

In implementations, determining characteristics of applications in use by the local host over the first time window includes querying a database for statistics tracking the number of application types of each TCP connection application type seen for the local host over the first time window.

In implementations, determining characteristics of applications in use by the local host over the time window further includes: determining a most frequently used application type by the local host over the first time window. In implementations, determining characteristics of applications in use by the local host over the time window further includes: prior to determining a most frequently used application type by the local host over the first time window, determining that a number of application type samples over the first time window is greater than a threshold.

In implementations, determining characteristics of applications in use by the remote host over the second time window includes: classifying each TCP connection application type seen for the remote host over the second time window; counting a number of application types of each TCP connection application type seen for the remote host over the second time window; and determining a most frequently used application type by the remote host over the second time window. In implementations, the method further includes: selecting between a most frequently used application type by the local host and a most frequently used application type by the remote host.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 4B illustrates an exemplary set of spoofing rules including static classifiers, conditions, and spoofing action to take that may be used in particular implementations.

Figure 1:
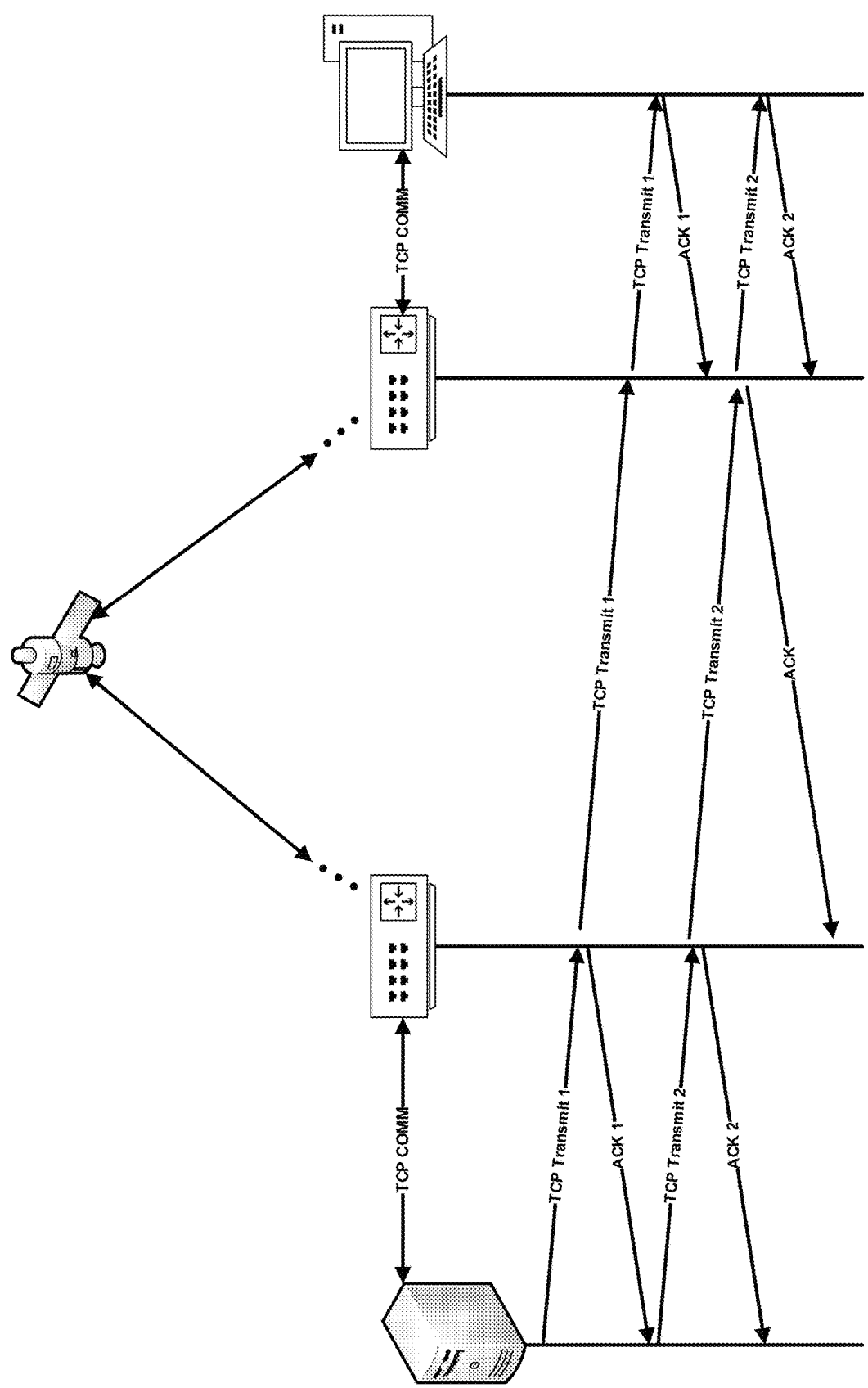
FIG. 1 illustrates an example implementation of TCP spoofing in a satellite network.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As used herein, the term "local host" refers to a host initiating a request to establish a TCP connection with another host. As used herein, the term "remote host" refers to a host that receives a request to establish a TCP connection from a host. For example, a local host may be a user device connected to a satellite terminal and a remote host may be a server (e.g., an internet host) in communication with an IP gateway.

As used herein, the term "TCP spoofer" refers to a device and/or control logic of a device associated with the local host that spoofs a TCP connection between a local host and a remote host, where the TCP connection is initiated by the local host. As used herein, the term "TCP spoofer peer" refers to a device and/or control logic associated with the remote host that is spoofing the TCP connection.

As used herein, the terms "Connection Control Block" or "CCB" refer to a block of memory that is allocated by a TCP spoofer or TCP spoofer peer to spoof a TCP connection. For example, a CCB may have a memory size between a few hundred and several thousand bytes. A CCB may hold state information for a TCP connection.

As used herein, the term "TCP spoofing resource conditions" refers primarily to the availability of memory blocks for spoofing a TCP connection. In some implementation, the term TCP spoofing resource conditions may refer to the availability of CCBs at a TCP Spoofer to spoof a TCP connection. Alternatively, the term TCP spoofing resource conditions may refer to the availability of buffer space for TCP spoofing or to a combination of control blocks and buffer space.

As noted above, when no memory resources are available to spoof a new TCP connection, the connection must be forwarded unspoofed, without mitigation for the challenging elements of the network environment. The extent to which this impacts performance of the connection depends upon characteristics of the application and hosts involved in the connection. For example, a host which sees moderate to heavy local packet loss, needs spoofing's local recovery from lost packets much more than a host which sees little to no local packet loss. Although existing capabilities exist for selective spoofing, existing classification rules are statically applied at all times, ignoring both host characteristics and spoofing resource availability. These classification rules are aimed at never spoofing certain types of applications irrespective of TCP spoofing resource availability.

Embodiments described herein address these problems by describing techniques for selectively spoofing, based on spoofing resource conditions and characteristics of the hosts involved in the TCP connection. These techniques may be implemented at a TCP spoofer device associated with a first host initiating a TCP connection with a second host. The TCP spoofer may be on the same LAN as the first host (e.g., it may be implemented in a router and/or modem that the first host device connects to). The TCP spoofer may determine spoofing resource conditions of the TCP spoofer and, optionally, a TCP spoofer peer associated with the second host; determine characteristics of the first host and the second host, including a dominant application type used by each host over a time window and packet loss conditions of the first host over a time window; and selectively spoof the TCP connection between the first host and the second host based on spoofing rules that include conditions based on the determined spoofing resource conditions and determined characteristics of the first host and the second host. In implementations, depending on the characteristics of the applications used by each host and/or packet loss conditions of the host initiating the TCP connection, the TCP spoofer may spoof the TCP connection, including the three-way handshake, spoof the TCP connection without spoofing the three-way handshake, allow the connection without spoofing, or block the connection.

In implementations, the characteristics of applications used by each host may be determined by using a classification system to classify TCP applications currently in use by each host (e.g., video streaming application, file transfer application, web browsing application, voice over IP application, etc.), and determining, over a time window, a dominant application type currently in use by each host. In implementations, packet loss conditions of the host initiating the TCP connection may be determined by tracking the number of packets lost by the host versus the number of packets transmitted by the host over a time window.

As such, by implementing the techniques described herein, those connections which will miss spoofing the least are forwarded unspoofed when spoofing resources are low, thereby freeing up resources for use by connections which need spoofing the most. This helps scale the number of simultaneous TCP connections which can be supported per remote site higher than can be achieved via static limits.

Figure 2:
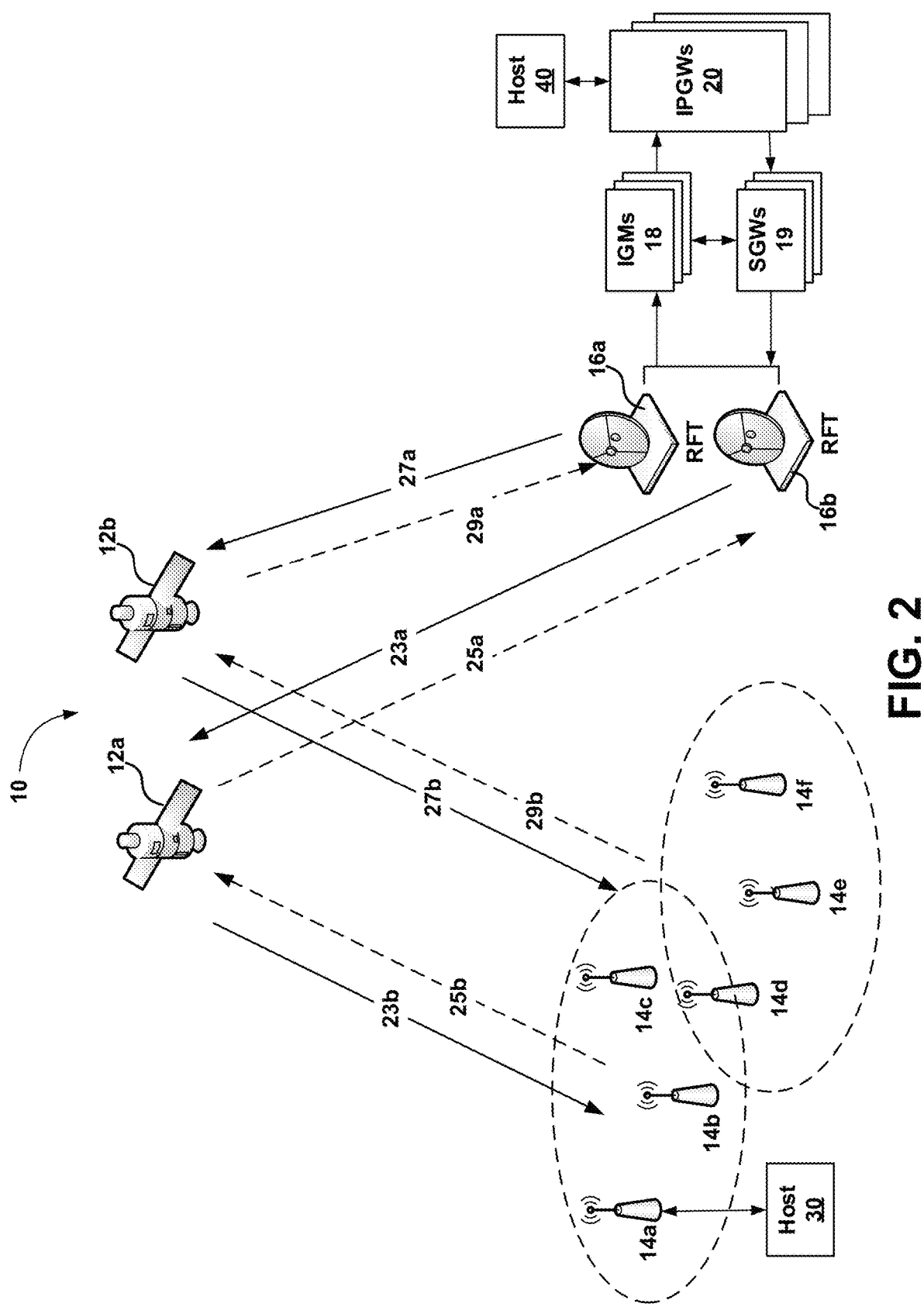
FIG. 2 illustrates an example satellite network in which TCP spoofing may be applied to a TCP connection between a first host and a second host in accordance with embodiments.

FIG. 2 illustrates an example satellite network 10 in which TCP spoofing may be applied to a TCP connection between a host 30 and a host 40. It should be noted that although the TCP spoofing techniques described herein will be primarily be described with reference to satellite networks including satellite terminals and IP Gateways, the spoofing techniques described herein may also be applied in terrestrial networks that do not utilize satellite terminals.

Satellite network 10 in this example can include multiple satellites 12a and 12b, remote terminals 14a-14f, radio frequency terminals (RFTs) 16a and 16b, inroute group managers (IGMs) 18, satellite gateways (SGWs) 19, and IP gateways (IPGWs) 20. The satellite network may be a shared access broadband network. Other types of shared access networks may include, for example, wireless networks such as 4$^{th}$ Generation Long Term Evolution (4G LTE) and WiMAX networks, which may include terminals other than Very Small Aperture Terminals (VSATs), such as cellular and WiFi equipped devices.

Feeder links may carry data between RFTs 16a and 16b and satellites 12a and 12b, and may include: forward uplinks 23a and 27a for transmitting data from RFTs 16a and 16b to satellites 12a and 12b, respectively; and return downlinks 25a and 29a for transmitting data from satellites 12a and 12b, respectively, to RFTs 16a and 16b. User links may carry data between satellites 12a and 12b and remote terminals 14a-14f, and may include: return uplinks 25b and 29b for transmitting data from remote terminals 14a-14f to satellites 12a and 12b, respectively; and forward downlinks 23b and 27b for transmitting data from satellites 12a and 12b, respectively, to remote terminals 14a-14f. Forward uplinks 23a, 27a and forward downlinks 23b, 27b may form outroutes, and return uplinks 25b, 29b and return downlinks 25a, 29a may form multiple sets of inroutes. SGWs 19 may include high capacity earth stations with connectivity to ground telecommunications infrastructure. SGWs 19 may be communicatively connected to RFTs 16a and 16b. RFTs 16a and 16b may be the physical equipment responsible for sending and receiving signals to and from satellites 12a and 12b, respectively, and may provide air interfaces for SGWs 19/IPGWs 20.

Satellites 12a and 12b may be any suitable communications satellites. For example, satellites 12a and 12b may be bent-pipe design geostationary satellites, which can accommodate innovations and variations in transmission parameters, operating in the Ka-band, Ku-band or C-band. Satellites 12a and 12b may use one or more spot beams as well as frequency and polarization reuse to maximize the total capacity of satellite network 10. Signals passing through satellites 12a and/or 12b in the forward direction may be based on the DVB-S2 standard (ETSI EN 302 307) using signal constellations up to and including at least 32-APSK. The signals intended to pass through satellites 12a and 12b in the return direction (from terminals 14a-14f) may be based on the Internet Protocol over Satellite (IPoS) standard (ETSI TS 102 354). Other suitable signal types may also be used in either direction, including, for example higher data rate variations of DVB-S2.

IPGWs 20 may be an ingress portion of a local network. IP traffic, including TCP traffic originating from a host 40 from the internet, may enter an SGW 19 through IPGWs 20. IPGWs 20 may each include a TCP spoofer, which may acknowledge TCP traffic sent through a SGW 19. For example, TCP traffic sent from host 40 to host 30 may be locally acknowledged by a TCP spoofer of an IPGW. Moreover, SGW 19 may be connected to an internet through IPGWs 20. IP traffic, including TCP traffic, from the internet may enter SGW 19 through IPGWs 20. As illustrated in FIG. 2, multiple IPGWs may be connected to a single SGW. The bandwidth of RFTs 16a and 16b can be shared amongst IPGWs 20. At each of IPGWs 20, real-time (RT) and NRT traffic flows may be classified into different priorities. These traffic flows may be processed and multiplexed before being forwarded to priority queues at SGW 19. RT traffic may go directly to an RT priority queue or SGW 19, while NRT traffic flows may be serviced based on the respective priority and volume. Data may be further packed into DVB-S2 code blocks and stored in a code block buffer before transmission.

IGMs 18 may be bandwidth controllers running bandwidth allocation algorithms. The IGMs may manage bandwidth of the remote terminals 14a-14f in the form of inroute groups (IGs), based in part on bandwidth demand requests from the remote terminals 14a-14f.

Data from an internet intended for remote terminals 14a-14f (e.g., VSATs) may be in the form of IP packets, including TCP packets and UDP packets, or any other suitable IP packets, and may enter a SGW 19 at any one of IPGWs 20, where the respective spoofer may send an acknowledgment back to the sender of the IP packets. The IP packets may be processed and multiplexed by SGW 19 along with IP packets from other IPGWs, where the IPGWs may or may not have the same service capabilities and relative priorities. The IP packets may then be transmitted to satellites 12a and 12b on forward uplinks 23a and 27a using the air interfaces provided by RFTs 16a and 16b. Satellites 12a and 12b may then transmit the IP packets to the VSATs using forward downlinks 23b and 27b. Similarly, IP packets may enter the network via the VSATs, be processed by the VSATs, and transmitted to satellites 12a and 12b on return uplinks 25b and 29b. Satellites 12a and 12b may then send these inroute IP packets to the IGMs 18/IPGWs 20 using return downlinks 25a and 29a.

Each of remote terminals 14a-14f can be, for example, VSATs and may connect to the Internet through satellites 12a and 12b and IPGWs 20/SGW 19. For example, remote terminal 14a may be used at a residence or place of business to provide a user with access to the Internet. VSATs or Mobile Satellite Terminals (MSTs), may be used by end users to access the satellite network, and may include a remote satellite dish for receiving RF signals from and transmitting RF signals to satellite 12a, as well as a satellite modem and other equipment for managing the sending and receiving of data. They may also include one or more remote hosts, which may be computer systems or other electronic devices capable of network communications at a site. Terminals 14a-14f may each include a TCP spoofer, which may locally acknowledge TCP traffic sent by a host 30 to a host 40. For example, a router or modem of a terminal's indoor satellite unit may locally acknowledge TCP traffic originating from a computing device (e.g., laptop) of a user.

Figure 3:
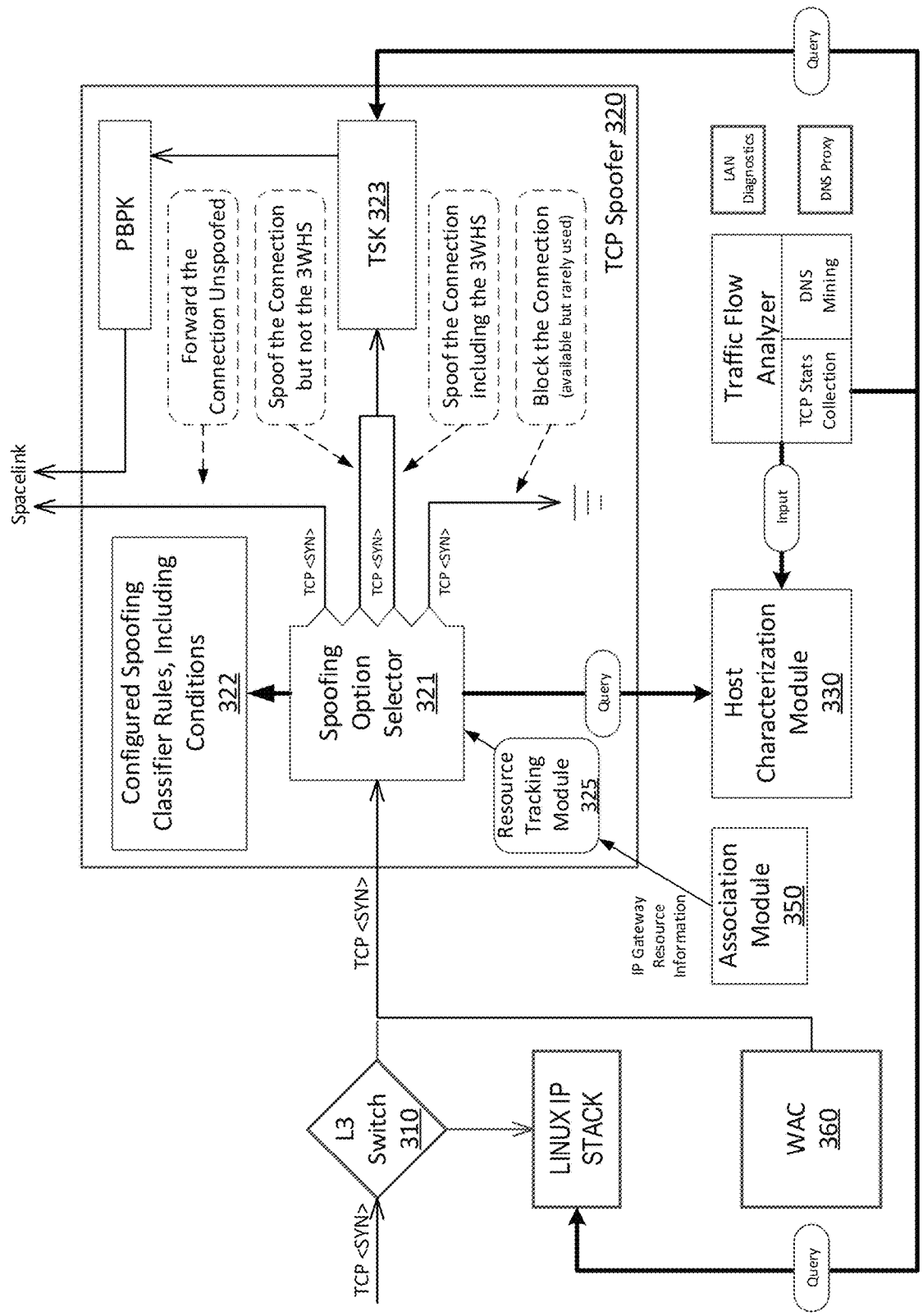
FIG. 3 is a block diagram illustrating an example architecture that may be implemented in a satellite terminal for selectively spoofing TCP connections in accordance with embodiments of the technology disclosed herein.
Figure 4A:
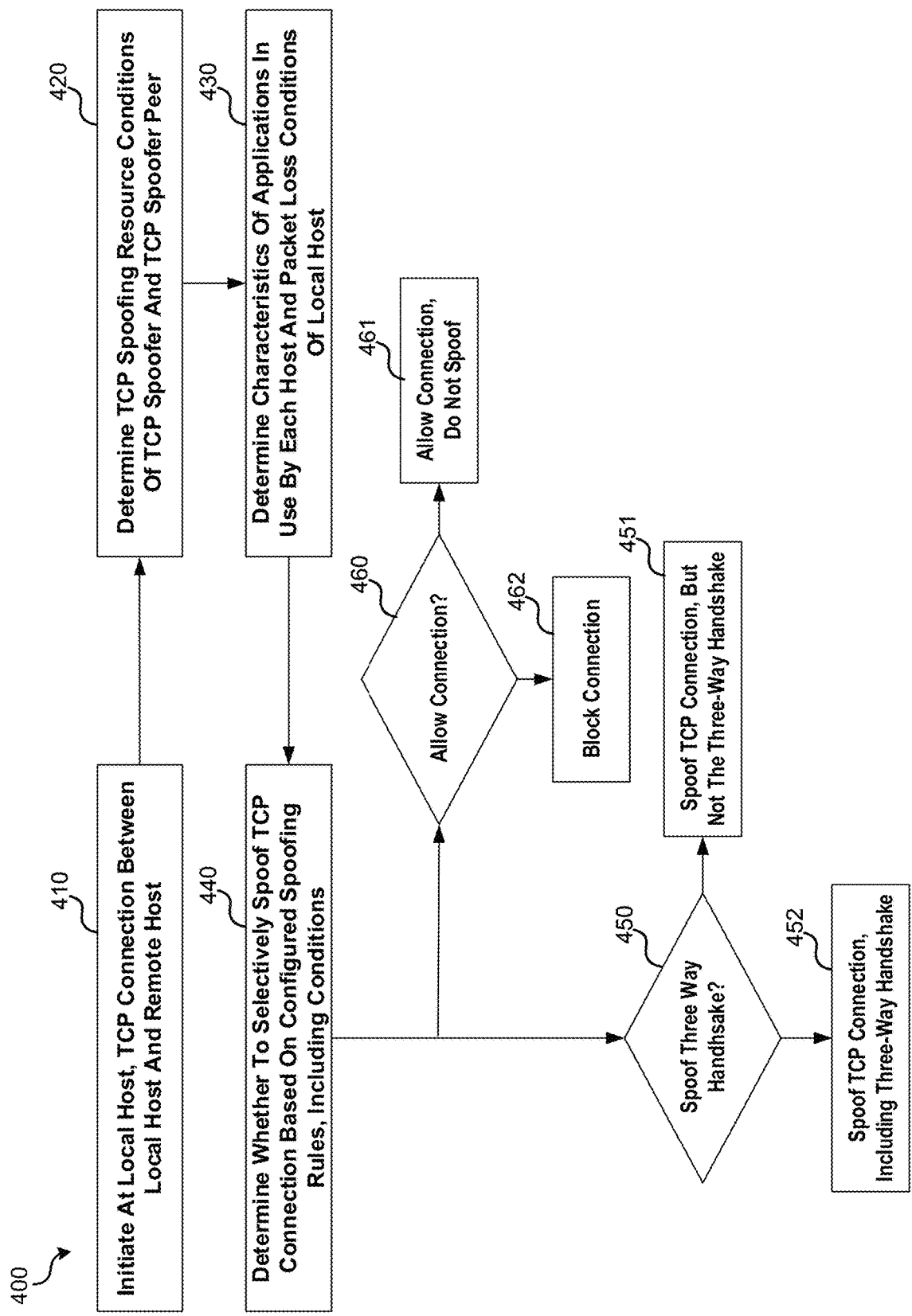
FIG. 4A is an operational flow diagram illustrating an example method that may be implemented by the satellite terminal of FIG. 3 to selectively spoof a TCP connection in accordance with embodiments.

FIG. 3 is a block diagram illustrating an example architecture that may be implemented in a satellite terminal (e.g., a terminal 14a-14f) for selectively spoofing TCP connections in accordance with embodiments of the technology disclosed herein. It should be noted that one or more of the components of FIG. 3 may be implemented in the satellite terminal in either digital form (e.g., as software running on a DSP or other processing device), as analog components, or some combination thereof. FIG. 3 will be described concurrently with FIG. 4A, which is an operational flow diagram illustrating an example method 400 that may be implemented by the satellite terminal of FIG. 3 to selectively spoof a TCP connection in accordance with embodiments. Although method 400 will be described in conjunction with a satellite terminal, it should be noted that method 400 may also be implemented by an IP Gateway.

With reference now to method 400, at operation 410, a local host initiates a TCP connection with a remote host. As illustrated in the example of FIG. 3, a Layer 3 Switch 310 (e.g., a router) in the terminal receives from a local host (e.g., a user device on a LAN) a new TCP <SYN> segment destined for a remote host (e.g., an internet host communicatively coupled to an IP Gateway 20). As noted above, the TCP <SYN> segment is a request from the local host to establish a TCP connection with the remote host. In some implementations, TCP traffic destined for a web server may be directed through a web accelerator (WAC) 360 by Layer 3 Switch 310.

When a new TCP <SYN> segment is received from the local host, at operation 420 a TCP spoofing kernel (TSK) 323 of TCP Spoofer 320 may control the components of TCP Spoofer 320 to determine if the connection should be spoofed and establish a spoofed TCP connection (if desired). In implementations, TCP Spoofer 320 may be implemented as a component of Layer 3 Switch 310 or a modem communicatively coupled to Layer 3 Switch 310.

In this example, the TCP Spoofer 320 uses a Spoofing Option Selector 321 to determine whether to spoof the TCP connection initiated by the local host (including or not including the three way handshake), forward the TCP connection unspoofed along the spacelink, or block the TCP connection. Selector 321 may compare the TCP <SYN> to a configured list of spoofing classifier rules 322, in order, until a match is found. The configured spoofing classifier rules may be compared to fields in the IP and TCP headers of the first connection establishment packet, i.e. the TCP <SYN> segment. TCP connections may be reclassified after establishment based on traffic characteristics (e.g. packet sizes) and changes in DiffServ Code Point (DSCP) values. The latter may be used by devices external to the core system such as Deep Packet Inspectors (DPIs) to signal reclassification needs. The classifier rules may examine IP addresses and/or subnets, TCP port numbers, DSCP values and a specific set of TCP options included in the TCP <SYN> segment.

Embodiments of the technology disclosed herein are directed to conditions to the classifier rules to allow different spoofing options to be used for different TCP connections which otherwise match the same TCP <SYN> classification. For example, consider a classifier rule that looks an HTTPS communication over TCP port 443. HTTPS may carry different types of traffic (e.g., web browsing versus bulk), but because the traffic is encrypted, fields in the packet itself cannot be looked at to try to determine the type of traffic, and so different types of traffic may match the same TCP <SYN> classification.

As noted above, there are two types of conditions that may be applied: i) TCP spoofing resource conditions at the time the TCP connection is initiated; and ii) characteristics of the hosts involved in the TCP connection. As such, prior to determining whether to selectively spoof the TCP connection based on configured spoofing rules, at operation 420, spoofing resource conditions may be determined for TCP spoofer and TCP spoofer peer. The TCP spoofer 320 may check its own internal status using resource tracking module 325. The TCP spoofer may also optionally track the TCP spoofing resource conditions of a TCP spoofer peer using association module 350 that receives spoofing resource information broadcast by the TCP spoofer peer. For example, an IP Gateway may multicast packets on its current resource usage, and this information may be received by association module 350 and passed to TCP spoofer 320 to track the resource usage of the IP Gateway.

At operation 430, characteristics of applications in use by each host and packet loss conditions of the local host (collectively, host characteristic) may be determined. As further described below, host characteristic may be learned by querying a host characterization module (HCM) 330 that examines the characteristics of previous TCP connections involving the hosts to determine two primary characteristics: the mix and type of applications being used by the local host (or both the local host and remote host); and the error characteristics, in particular, packet loss, associated with the local host.

TCP connection, but not the three-way handshake (operation 451), or spoof the TCP connection including the three-way handshake (operation 452). If a determination is made not spoof the TCP connection, at decision 460 a decision is made as to whether to allow the TCP connection without spoofing (operation 461), or block the connection (operation 462).

Table 1, below, illustrates an exemplary set of spoofing classifier rules, including TCP resource and host conditions, that may be used in a particular implementation. Table 1 will be described with reference to FIG. 4B, which illustrates the exemplary set of spoofing rules of Table 1, including static classifiers, conditions, and spoofing action to take.

TABLE 1

TCP Spoofing Rules with Conditions

| | |
|---|---|
| Rule 1 | Spoof all TCP connections which have a TCP destination Port of 80 (indicating HTTP) unconditionally. |
| Rule 2 | Spoof all TCP connections which have a TCP destination Port of 443 (indicating HTTPS) unconditionally. |
| Rule 3 | If the resource use level is greater than 98%, don't spoof any TCP connections (which did not match the preceding rules). |
| Rule 4 | Don't spoof TCP connections which have a TCP destination Port of 20 (indicating FTP Data) for hosts which have a low error when the resource use level is greater than 90%. |
| Rule 5 | Spoof all TCP connections which have a TCP destination Port of 20 (indicating FTP Data) "unconditionally when the previous rule did not apply". |
| Rule 6 | Spoof TCP connections which have a TCP destination Port of 21 (indicating FTP Control) when (there are plenty of resources, i.e.) the resource use level is less than 80%. |
| Rule 7 | Don't spoof TCP connections which have a TCP destination Port of 21 (indicating FTP Control) "unconditionally when the previous rule did not apply". |
| Rule 8 | Spoof TCP connections which have a TCP destination Port of 23 (indicating Telnet) when (there are plenty of resources, i.e.) the resource use level is less than 80%. |
| Rule 9 | Don't spoof TCP connections which have a TCP destination Port of 23 (indicating Telnet) "unconditionally when the previous rule did not apply". |
| Rule 10 | Spoof TCP connections for hosts which predominantly use Interactive applications when the resource use level is above 94%. The rule will stop being reached when Rule 3 becomes true. |
| Rule 11 | Spoof all TCP connections (which did not match one of the above rules). |

With TCP resource conditions and characteristics of hosts involved in the connection (host conditions) determined, at operation 440, selector 321 may compare the TCP <SYN> to a configured list of spoofing classifier rules, including TCP resource and host conditions. As such, if a matched spoofing classifier rule includes a condition, TCP Spoofer 320 may determine if the condition is true. If the condition is true, the rule applies to the TCP connection and TCP Spoofer 320 may assign the TCP connection a specified class of service and spoof (or not spoof) the TCP connection as defined by the rule. If the condition is false, the spoofer may resume parsing the classifier rules 322 beginning with the next rule. This process may continue until a rule is matched (including its condition if any). In embodiments, the last rule in a list of configured spoofing rules 322 may be a default rule that matches every packet.

It should be noted that although in the example of method 400 a determination of whether to selectively spoof the TCP condition is based on both spoofing resource conditions and host characteristic conditions, in some implementations, conditional spoofing may consider only one of these conditions or none of these conditions. For example, if spoofing memory resource conditions are good, there may be no need to selectively spoof based on host characteristics.

If a determination is made to spoof the TCP connection, at decision 450 a decision is made as to whether to spoof the As discussed above, rules may be processed in order (e.g., starting with Rule 1) with the first matching rule being applied. If a rule does not match, processing may continue to the next rule. Conditions may be combined together first and then ANDed as a whole with the static classifier result. As illustrated in this particular example, Rules 3, 4, 6, 8, and 10 include conditions that depend on at least one of: a dominant host application type, a packet loss level of the local host, or a TCP resource use level.

As noted above, TCP spoofing introduces the following benefits: (i) it speeds up the TCP connection set-up by spoofing the TCP three-way handshake to hide the high latency (e.g. satellite) resulting from the RTT of the connection setup process; (ii) it speeds up transmit window growth to increase throughput significantly faster; (iii) it provides recovery from packets lost between the remote host and the terminal and/or between the IP Gateway and the Internet host using low latency (i.e, terrestrial) RTTs, again hiding the high (e.g. satellite) round trip latency; and (iv) it provides recovery from packets lost between the terminal and the IP Gateway transparently to the end hosts (i.e. without causing changes to the TCP connection congestion window). The first two benefits listed may or may not be useful for a particular connection. For example, for a short-lived TCP connection (e.g., single data segment in each direction, instant messaging connection, etc.), the three way handshake represents a significant portion of the total transaction time. But for a long-lived TCP connection (e.g., large file transfer), the time saved to set up the connection may have no or only minimal impact on the transfer time of data using the connection. Additionally, a TCP connection that just sends a small amount of data in each direction does not require high throughput and, thus, accelerating transmit window growth provides no benefit. If the amount of data to be sent is smaller than the initial transmit window being used by the sending TCP implementation, transmit window size growth is irrelevant. Evaluating the faster window growth benefit for a given TCP connection is sometimes difficult because: (i) it is difficult to know in advance how much data an application is going to send; and (ii) the size of the initial window can vary greatly across TCP stack implementations and within implementations. On the other hand, most of the time, even when not useful, accelerating the three-way handshake and accelerated TCP window growth are not harmful.

In general, the last two benefits are always relevant. Packet loss can always occur and faster recovery is always desirable. However, it is possible to rank the benefit provided by faster recovery based on the probability of packet loss. In other words, hosts which are more likely to experience packet loss get more benefit from quick recovery of lost packets. Thus, when TCP spoofing resources are scarce, TCP connections for which the first two benefits do not apply (or are less important) and the last two benefits are (relatively) less important are, generally, the best candidates for not being spoofed.

Particular techniques for determining TCP spoofing resource conditions and host characteristic conditions for selective spoofing are further described below.

TCP Spoofing Resource Conditions

Implementations described herein are directed to determining spoofing resource conditions based on the availability of Connection Control Blocks (CCB), blocks of memory that are allocated to spoof a TCP connection. Although implementations described herein will be described with reference to determining the availability of CCB to a TCP Spoofer as a whole, in some implementations, the availability of CCB may be determined at a per class of service (COS) level. Moreover, in some implementations the availability of other memory resources (e.g., buffer space) may be taken into account.

In order to spoof a TCP connection, a CCB may be made available in the terminal and a CCB may be made available in the IP Gateway. Each of the terminal and IP Gateway may have a limited number of CCBs available, which may be determined via configuration depending on the available memory space and size of each CCB. In the case of an IP Gateway, a pool of CCBs may be shared by multiple terminals.

In one particular implementation, TCP resource conditions that are applied as conditions to spoofing classifier rules 322 may be based on a weighted maximum of the percent of CCBs in use in a TCP Spoofer (e.g., terminal) and a TCP Spoofer Peer (e.g., IP Gateway). For example, in one particular embodiment, an effective CCB resource percentage in use may be determined by Equation (1):

$$CR_{CCB} = \text{Minimum (Maximum} ((w_{SPOOFER} * pCCB_{SPOOFER}), (w_{PEER} * pCCB_{PEER})),100) \quad (1)$$

Where:
$CR_{CCB}$ is the effective CCB resource percentage in use; $pCCB_{SPOOFER}$ is the instantaneous percent of CCBs in use in a device associated with a TCP Spoofer, i.e. the number of CCBs in use divided by the total number of CCBs available; $pCCB_{PEER}$ is the percent of CCBs in use in the TCP Spoofer Peer, i.e. the number of CCBs in use divided by the total number of CCBs available; $w_{SPOOFER}$ is the weight used to adjust the percent of CCBs in use in the TCP Spoofer; and $w_{PEER}$ is the weight used to adjust the percent of CCBs in use in the TCP Spoofer Peer. The weights of Equation (1) may be used to adjust the percent in use values without updating the conditions in the TCP spoofing rules themselves, if desirable. Classifier rule conditions may compare $CR_{CCB}$ to condition specified percentages using inequalities. For example, if the effective CCB resource percentage in use is greater than a predetermined threshold (e.g., "if $CR_{CCB}$>=90%") or if the effective CCB resource percentage in use is less than a predetermined threshold (e.g., "if $CR_{CCB}$<80%"), a spoofing rule condition of spoofing classifier rules 322 may be true or false.

In the implementation of FIG. 3, the TCP Spoofer of Equation (1) may be a terminal and the TCP Spoofer Peer of Equation (1) may be an IP Gateway. In this implementation, $pCCB_{SPOOFER}$ may be the percent of CCBs in use in the terminal and $pCCB_{PEER}$ may be the percent of CCBs in use in the IP Gateway, most recently received from the IP Gateway via Association messaging using association module 350. In this implementation, the TCP Spoofer parameters may be set as shown by Table 2, below.

TABLE 2

TSK Spoofing Resource Parameters

| Parameter | Description | Range | Default Value |
| --- | --- | --- | --- |
| Terminal Weight | Weight to be applied to the terminal's percent of CCBs in use when calculating the overall level of resource use. | 0.0 to 2.0 | 1.0 |
| IP Gateway Weight | Weight to be applied to the IP Gateway's percent of CCBs in use when calculating the overall level of resource use. | 0.0 to 2.0 | 0.8 |

In the above example, by default the terminal percent of CCBs in use may be as is (i.e., weight of 1) but the IP Gateway percent of CCBs in use may be biased to be slightly more aggressive in CCB use (i.e., weight less than 1). This biasing may be beneficial, because the IP Gateway information may not be as recent as the terminal information because it may be received periodically. If, for some reason, e.g. the IP Gateway the terminal is associated with has not been updated to provide the information, the pCCB value for the IP Gateway may be treated as having a value of zero.

Host Characterization Conditions

As noted above with reference to FIG. 3, host characterization module 330 tracks i) per host information related to a mix of applications used by the local host (and optionally, by the remote host); and ii) a level of local packet loss seen by the local host for each application.

When resources are constrained and a choice has to be made as to which TCP connections to spoof, connections which involve an actual end user waiting generally should be given preferential access to spoofing resources. Such applications are already given priority access to other types of system resources (e.g. bandwidth) by means of Class of Service classification. Implementations described herein extend this concept to TCP spoofing memory blocks (e.g., CCBs or optionally, buffer space).

Determining the type of application in use for a TCP connection can sometimes be problematic because many applications use the same TCP port numbers. In particular, Port 80 and Port 443 are no longer used just for interactive web browsing. They are a popular choice for all types of applications, including background download types of applications, because these ports get through firewalls and NATs much more easily than other port numbers. Thus, getting the classification right from just the contents of the TCP <SYN> segment is a problem. For CoS, the current solution is to classify to the interactive priority and then, after enough data packets have been transferred to make an assessment, reclassify the connections which are not really interactive. This approach does not work for CCBs as a resource, however, because the reclassified TCP connections are still being spoofed. Another method is needed in order to try to improve the initial classification of the connections.

Embodiments, further described below, track host characteristics to aid in the initial classification by keeping a history of the applications used by each host in the past. Each TCP connection may be classified into one of several types (e.g. transactional, interactive, streaming, bulk, etc.). HCM 330 may keep track of how many TCP connections of each type a given host is involved in over time. During spoofing, the application types may be mapped to which TCP spoofing benefits are most useful to it.

Tracking local host packet loss conditions and using it as a condition for TCP spoofing may also be beneficial as the more packet loss a host experiences, the more it needs the local packet loss recovery capability provided by spoofing, even if it does not need spoofing for startup acceleration or window size growth. A decade or so ago, when remote site networks were all wired, local packet loss was virtually non-existent. Now, almost every remote site (e.g. path between local host and terminal) has at least some wireless element. Packet loss on WiFi networks depends on network specific characteristics and can sometimes be significant. It also varies over time based on host positioning (i.e. roaming) within the network and based on potential intermittent interference.

Figure 5:
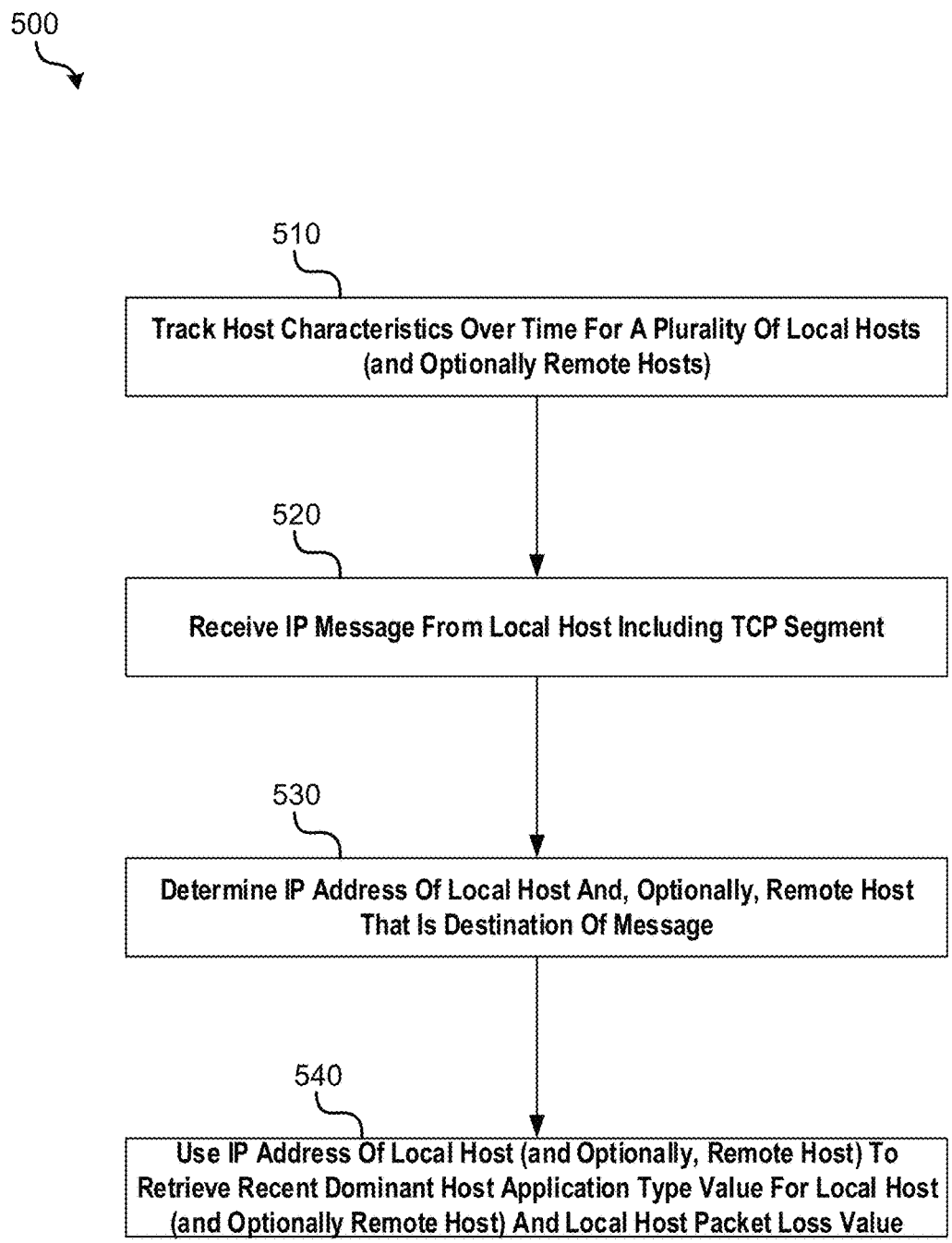
FIG. 5 is an operational flow diagram illustrating an example method of tracking host characteristics and using them for selective spoofing in accordance with embodiments.

FIG. 5 is an operational flow diagram illustrating an example method 500 of tracking host characteristics (e.g., applications types in use by hosts and packet loss conditions of local host) and using them for selective spoofing in accordance with embodiments. FIG. 5 will be described in conjunction with FIG. 3.

At operation 510, HCM 330 tracks host characteristics over time for a plurality of local hosts (e.g., user devices connected to a terminal) and, optionally, one or more remote hosts (e.g., IP Internet hosts). In implementations, host characteristics may be tracked by examining the TCP connections associated with the host, DNS information mining (especially for remote hosts), and other suitable means. As further described below, TCP applications currently in use by each host may be tracked and a dominant application type currently in use by each host may be determined over a time window. Additionally packet loss conditions experienced by local hosts may be tracked over a time window. The tracked host characterizations may be stored in a data structure that maps the host's IP address to the tracked characteristics.

At operation 520, an IP message or datagram including a TCP segment is received from a local host that has been tracked at operation 510. For example, TCP Spoofer 320 may receive an IP message including a TCP <SYN> segment from the local host. At operation 530, TCP Spoofer 320 determines the IP address of the local host from the IP message. TCP Spoofer 320 may also use the IP message to determine the IP address of the remote host associated with the TCP connection. TCP Spoofer 320 may extract the IP address information from the TCP <SYN> message received from the local host. For example, the message may include an IP datagram including a source and destination IP address. Thereafter, TCP Spoofer 320 may query HCM 330 for host characteristics for the local host (and optionally, the remote host) by passing the IP addresses of the local host and remote host associated with the TCP connection.

At operation 540, HCM 330 may return to TCP Spoofer 320 a recent dominant host application type value and a local host packet loss level value. These values may thereafter be considered as part of Spoofing Classifier Rules 322 in determining whether to spoof the TCP connection as described with reference to FIG. 4A. Methods for determining these values are further described below.

Host Application Tracking and Characterization

Figure 6:
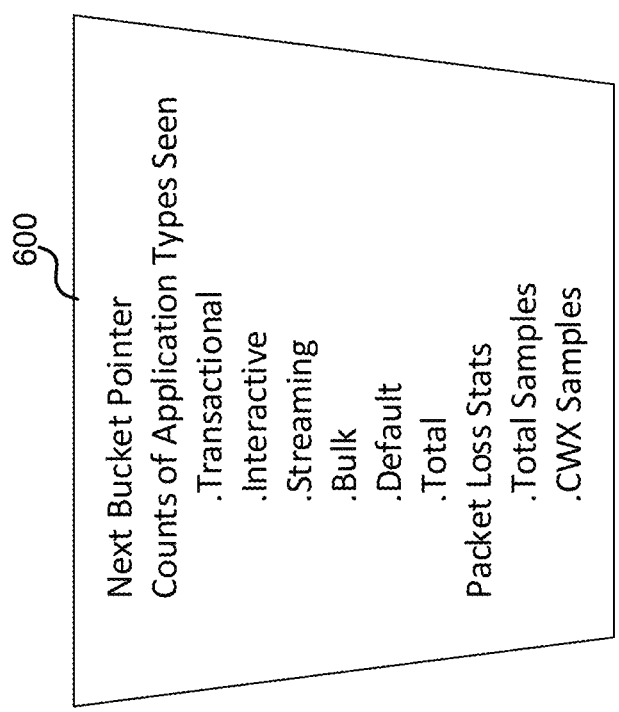
FIG. 6 illustrates a bucket for storing counts of application types seen and packet loss statistics of a host over a time window.

In various embodiments, for each host: HCM 330 may implement a traffic flow analyzer to classify each TCP connection application type seen, and count the number of application types of each TCP connection application type seen. Each time a new TCP connection application type is detected for a host, a counter associated with the application type may be incremented. These statistics may be stored in a configurable number of "bucket" data structures of configurable size (e.g., in seconds) that cumulatively represent a configurable tracking time window (e.g., seconds, minutes, hours, or days) for the host. A conceptual illustration of a bucket 600 is shown in FIG. 6, which stores counts of application types seen along with packet loss statistics (further described below). As illustrated in the implementation of FIG. 6, HCM 330 may classify TCP connections as belonging to one of five application types or categories: transactional; interactive; streaming; bulk; or default. A transactional application type may correspond to TCP connection having a short connection time (e.g., a few bytes of data such as instant messages). An interactive application type may correspond to a TCP connection such as web browsing. A streaming application type may correspond to a TCP connection that carries streaming video or audio data. A bulk application type may correspond to a TCP connection that carries a large amount of data (e.g., file transfer of a movie, video game, or other large file). A default application type may correspond to a TCP connection that cannot be identified as having a particular classification. In such instances, the default application type may be treated as an interactive or streaming application type. As would be appreciated from the above categorizations, transactional and interactive application types may be good candidates for spoofing, including the three-way handshake, as the total time of the TCP connection is very short. By contrast, bulk application types may be the best candidates for not spoofing if TCP spoofing resources are limited.

It should be noted that although the TCP application types described herein will primarily be described with reference to these five aforementioned application types, these TCP application types are exemplary and other categorizations may be used. For example, the grouping or number of application types may vary. Particular methods of classifying TCP connections are further described in U.S. patent application Ser. Nos. 15/344,684 and 15/348,837, which are incorporated herein by reference.

Figure 7:
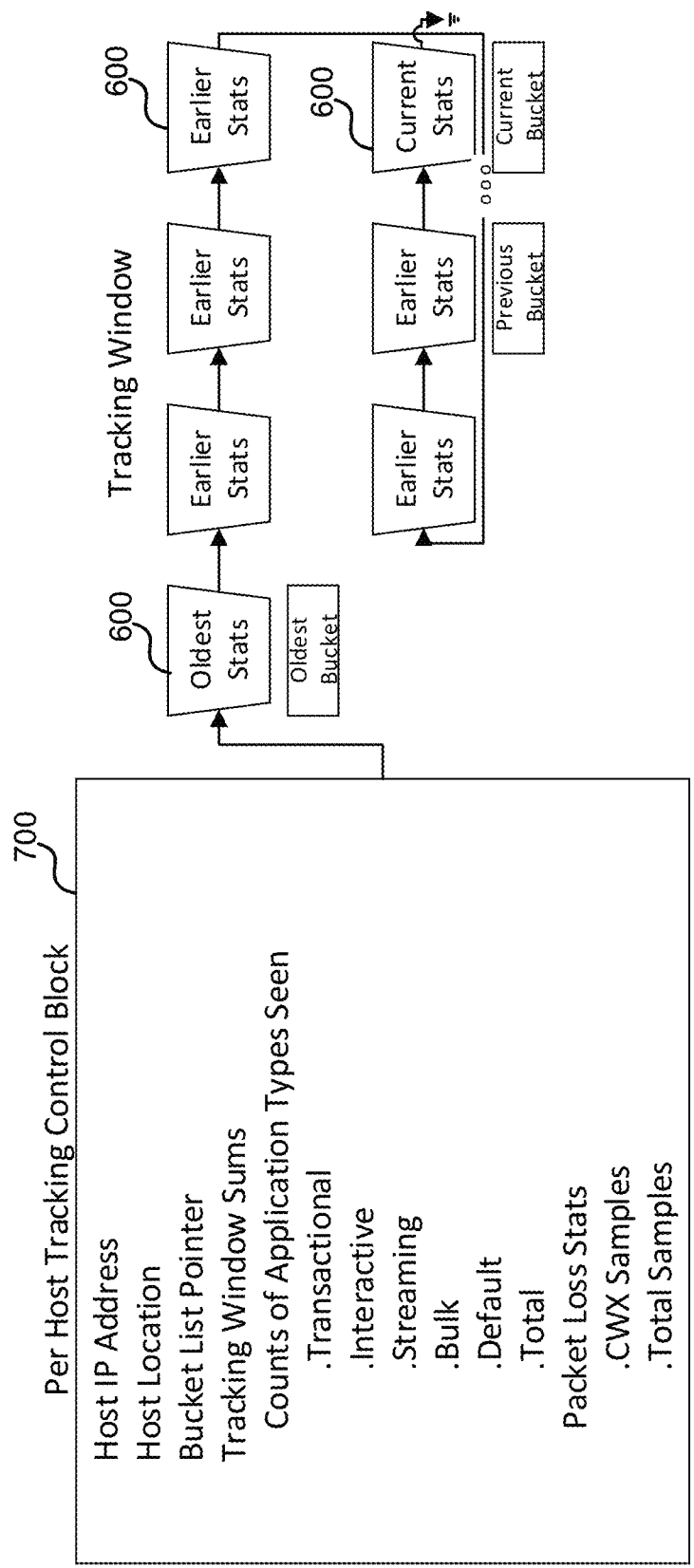
FIG. 7 illustrates a tracking control block of a host having a tracking window including a plurality of recent tracking buckets.

In one implementation, for each host a tracking control block may be used to store accumulated statistics from all buckets and an identification of the host. This is illustrated by FIG. 7, which illustrates a tracking control block 700 of a host having a tracking window including a plurality of recent buckets 600. As illustrated, the host tracking control block 700 stores counts of application types seen and packet loss statistics over the tracking window for the host. Additionally, the host tracking control block 700 stores a Host IP Address, a Host Location (i.e., whether the host is local or remote), and a bucket list pointer. As previously noted, the number of recent buckets (i.e., tracking window size) may be configurable and depend on the type of host (e.g., local versus remote host). Different size buckets and tracking windows may be used for local and remote hosts because local hosts may change which applications they are using relatively quickly whereas remote (e.g., Internet) hosts are generally dedicated to a specific set of applications. For a current bucket 600, each time a statistic is incremented, the corresponding stat is also incremented in the tracking control block 700.

Figure 8:
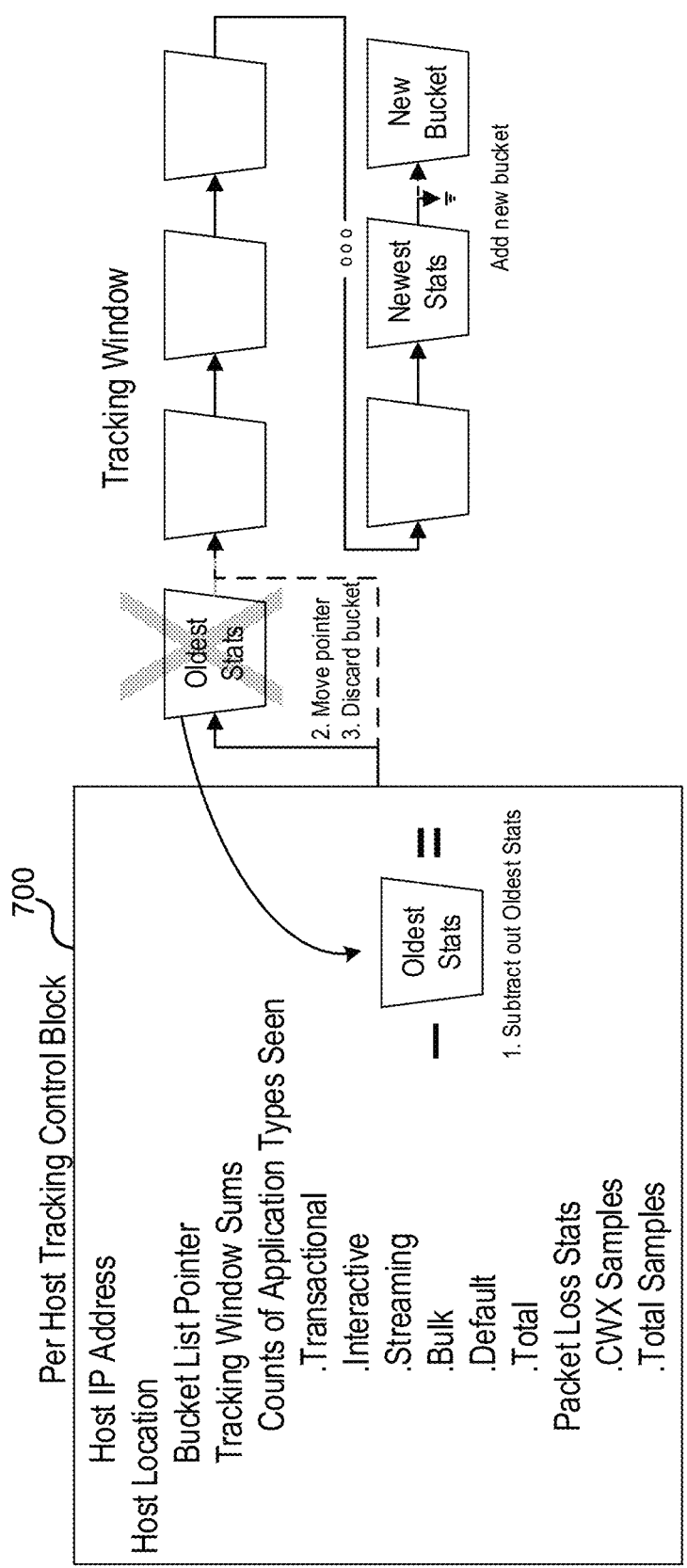
FIG. 8 illustrates a process of creating a new tracking bucket for the tracking control block of FIG. 7.

In the example of implementation of FIG. 7, when a current statistics bucket reaches its time limit, a new tracking bucket is created and added to the end of the tracking window. This process is illustrated by FIG. 8. As shown, if the tracking window is full (i.e. the tracking window already has the maximum number of buckets), tracking control block 700 may be updated such that at the same time the new bucket is added, the counts from the oldest bucket are subtracted from the tracking control block 700, the oldest bucket is discarded, and the bucket list pointer is updated. Additionally, packet loss statistics from the oldest bucket are removed.

Recent Dominant Host Application Type Value

As discussed above with reference to operation 540 of FIG. 5, HCM 330 may return to TCP Spoofer 320 a recent dominant host application type value for hosts involved in a TCP connection that may be considered as a condition of Spoofing Classifier Rules 322 in determining whether to spoof the TCP connection between the hosts. Implementations described below are directed to the derivation of a Recent Dominant Host Application Type (RDHAT) value, which returns the mostly frequently used recent application type by a host.

Following the above example application categorization of FIGS. 6-8, when TCP Spoofer 320 calls the HCM 330 requesting information about two hosts involved in a TCP connection, the value returned may be one of: Transactional; Interactive; Streaming; Bulk; Default; Mixed; Not Enough Samples; or Unknown. In the case of Unknown, HCM 330 may have no entry in its database for either of the specified host IP addresses. In the case of Mixed, HCM 330 may have an entry for at least one of the hosts in its database, but not one type of application meets the criteria to be defined as dominant. In the case of Not Enough Samples, HCM 330 may have an entry in its database for at least one of the hosts but not have enough samples to make a reasonable application type judgment. In the case of Default, an application type determination may not have been made for either of the hosts.

Figure 9:
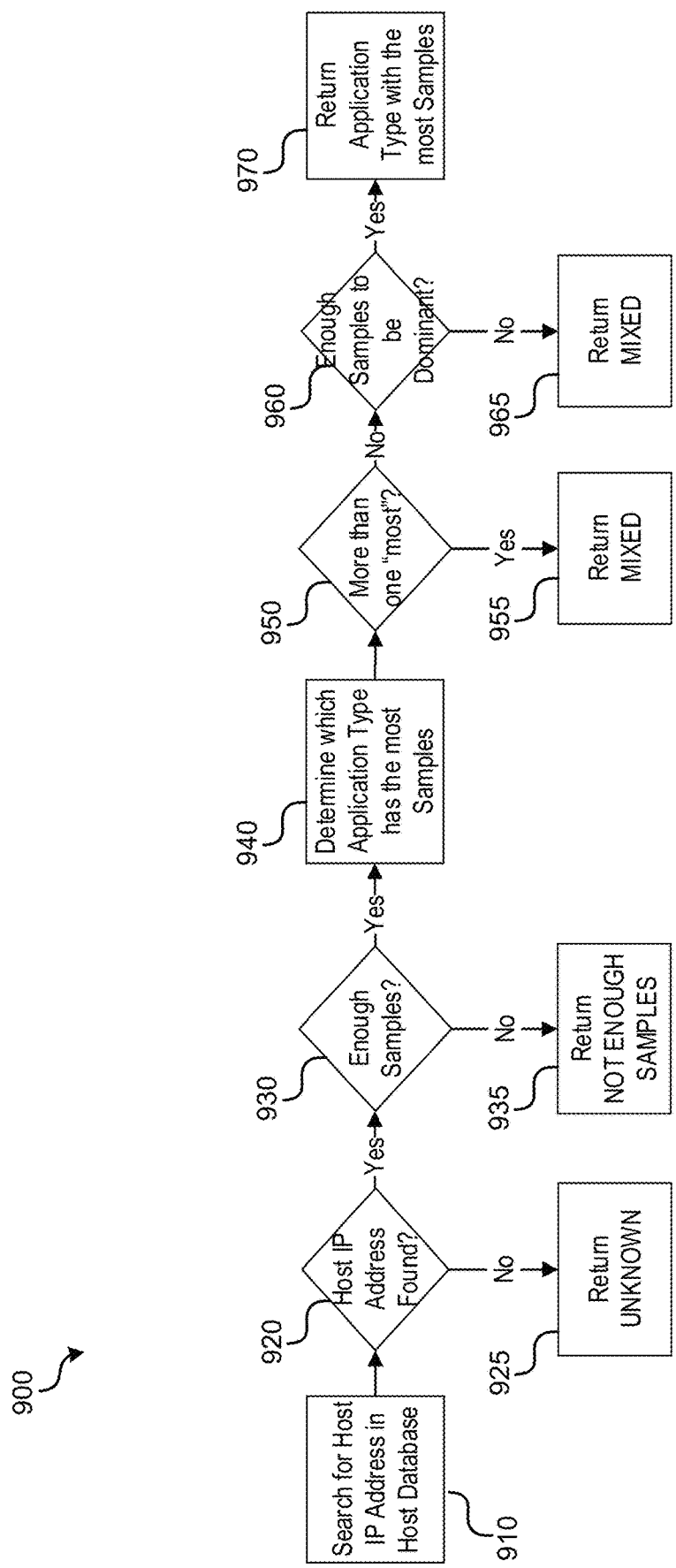
FIG. 9 is an operational flow diagram illustrating an exemplary method of determining a recent dominant host application type value in accordance with embodiments.

FIG. 9 is an operational flow diagram illustrating an exemplary method 900 of determining a RDHAT value. Prior to implementing method 900 TCP Spoofer 320 may receive an IP message including a TCP segment from a local host, determine an IP Address of the local host (and optionally, the remote host), and query HCM 330 for the RDHAT value of the local host and/or the remote host. At operation 910, HCM Module 330 may search for the host IP Address in a database. If the host IP Address is not found (decision 920), HCM 330 may return an Unknown value.

Otherwise, if the host IP address is found (decision 920), at decision 930 HCM 330 may determine if there are enough application type samples. In implementations, a configurable, minimum number of connection samples within a tracking window (e.g., the tracking window illustrated by FIG. 7) may be required to calculate a valid RDHAT. For example, a default value of 10 may be set. If fewer than the minimum number of connection samples have been seen for the host within a tracking window, at operation 935 a Not Enough Samples RDHAT value for the host may be returned.

Otherwise, if there are enough application type samples, at operation 940 a determination is made as to which application type has the most samples (i.e., counts). At decision 950, it is determined if there are two or more application types that have the same value for the most entries. If there are, at decision 955 a Mixed application type value may be returned. Otherwise, at decision 960 a determination is made as to whether there are enough application type samples to be dominant. In implementations, this determination may be made by dividing the connection application type with the highest count by the total number of each TCP connection application type seen for the remote host over the second time window; and value is greater than or equal to the threshold, then the connection application type may be considered dominant and returned at operation 970 as the host's RDHAT for the current time window. Otherwise, if the value is less than the threshold, at operation 955 a Mixed value may be returned.

Figure 10:
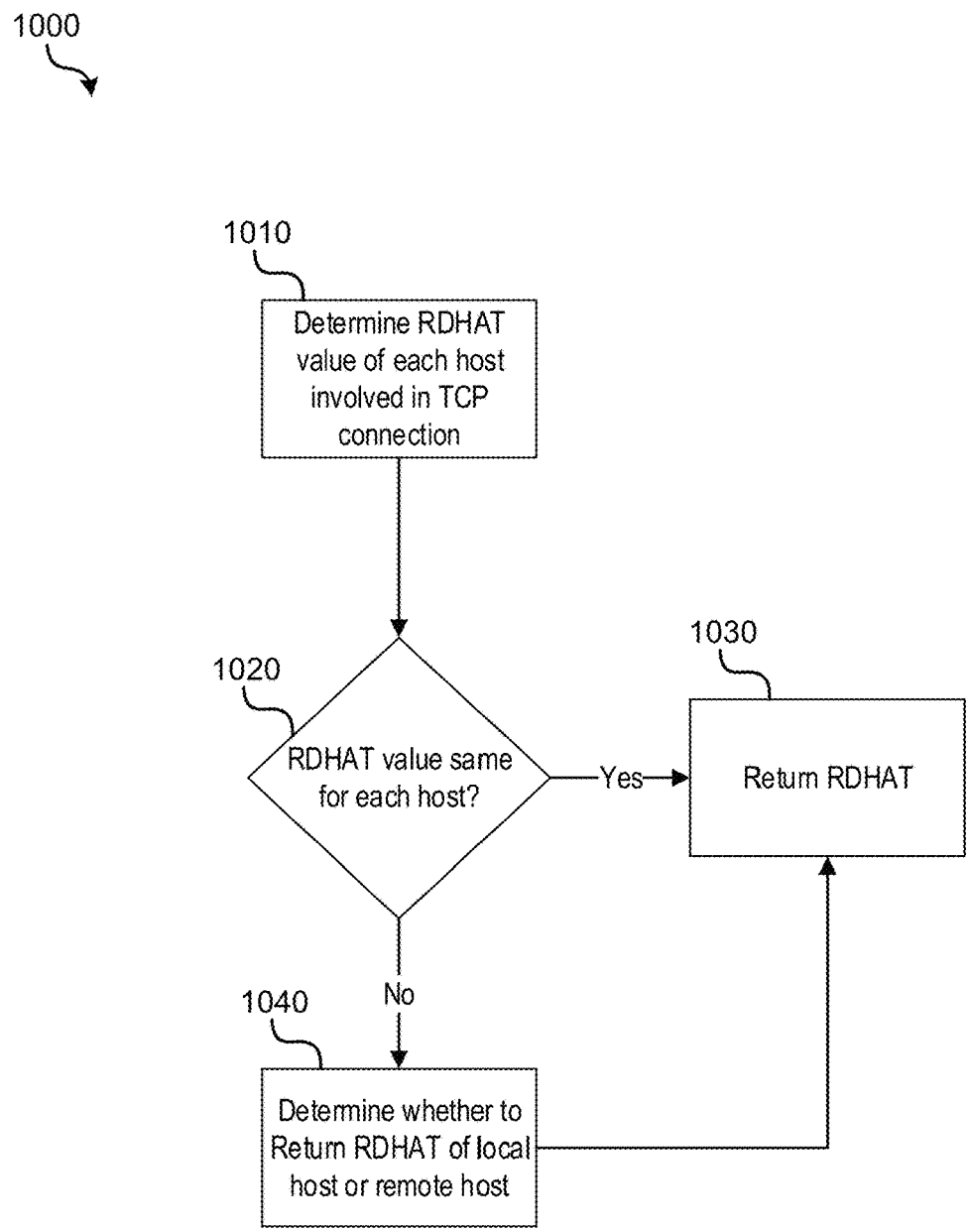
FIG. 10 is an operational flow diagram illustrating an example method for calculating a final recent dominant host application type value when a recent dominant host application type value is calculated for both a local host and a remote host in accordance with embodiments.

As noted above, in some implementations, a RDHAT value may be calculated for both the local host and remote host. FIG. 10 is an operational flow diagram illustrating an example method 1000 for calculating a final RDHAT value when an RDHAT value is calculated for both the local host and remote host. At operation 1010, a RDHAT value may be calculated for both the local host and remote host following the process of method 900. At decision 1020, it is determined whether the RDHAT value is the same for each host. If the RDHAT value is the same, then at operation 1030 the RDHAT value shared by the hosts may be returned. However, in some instances, the RDHAT value may not be the same for the local host and the remote host. In such cases, one option would be to return a Mixed RDHAT value to the TCP Spoofer when the two values do not agree. However, a more intelligent estimate may be provided by choosing between the RDHAT value of the local host or remote host (operation 1040). In one implementation, the choice may be based on a confidence level determined by the number of samples available for each host and/or the percentage of samples of each host that of the dominant application type. Alternatively, in another implementation, the more conservative RDHAT value between the two may be chosen. This implementation is illustrated by Table 3, below.

TABLE 3

Returned RDHAT Value

| Returned RDHAT Source | Destination RDHAT | | | | | | | |
|---|---|---|---|---|---|---|---|---|
| RDHAT | Unknown | NES | Mixed | Default | Bulk | Streaming | Interactive | Transactional |
| Unknown | Unknown | NES | Mixed | Default | Bulk | Streaming | Interactive | Transactional |
| NES | NES | NES | Mixed | Default | Bulk | Streaming | Interactive | Transactional |
| Mixed | Mixed | Mixed | Mixed | Default | Bulk | Streaming | Interactive | Transactional |
| Default | Default | Default | Default | Default | Bulk | Streaming | Interactive | Transactional |
| Bulk | Bulk | Bulk | Bulk | Bulk | Bulk | Streaming | Interactive | Transactional |
| Streaming | Streaming | Streaming | Streaming | Streaming | Streaming | Streaming | Interactive | Transactional |
| Interactive | Interactive | Interactive | Interactive | Interactive | Interactive | Interactive | Interactive | Transactional |
| Transactional | Transactional | Transactional | Transactional | Transactional | Transactional | Transactional | Transactional | Transactional |

Local Host Packet Loss Level Value

As discussed above with reference to operation 540 of FIG. 5, HCM 330 may return to TCP Spoofer 320 a local host packet loss level (HPLL) value that may be considered as a condition of Spoofing Classifier Rules 322 in determining whether to spoof the TCP connection between the local and remote host. The HPLL provides an indication of whether or not the local host recently experienced packet loss on its tracked TCP connections, and if so, the degree of packet loss. As illustrated in the example of FIGS. 6-7, local host packet loss statistics may be tracked for each local host over a time window using the same per host bucket and tracking window structure to store the information as is used to track application types (e.g., host tracking control blocks 700 having a configurable number of buckets 600). Because local hosts may be mobile, recent packet loss (e.g., packet loss within last minute or minutes) may be of most interest. As such, in some implementations, bucket and window sizes may be adjusted to account for this.

In one implementation, a HPLL may be directly determined for the local host by counting the number of packets lost by the local host over a tracked time window and dividing that number by a total number of packets transmitted by the local host over the tracked time window. In an alternative implementation, where a direct determination of packet loss is not possible, congestion window exceeded (CWX) events may be used to indicate that packet loss has occurred on the TCP connection. A check for CWX events may occur on every TCP acknowledgement and counts may be kept for a total number of samples and the total number of CWX events.

In implementations, the determined HPLL may be categorized into one of a plurality of categories, each of the plurality of categories indicative of a range of packet loss (e.g., as a percentage of total packet loss). One exemplary set of categories is described below. However, it should be noted that other categories may be used and that in some instances a packet loss percentage may instead be directly returned.

The HPLL may be categorized into one of the following categories: none, low, medium, high, not enough samples, or unknown. In this implementation, the unknown category specifies that HCM 330 has no entry in its database for the specified host IP address. In this implementation, the not enough samples category means that HCM 330 has an entry in its database for the host but does not yet have enough data samples to make a reasonable packet loss determination.

Figure 11:
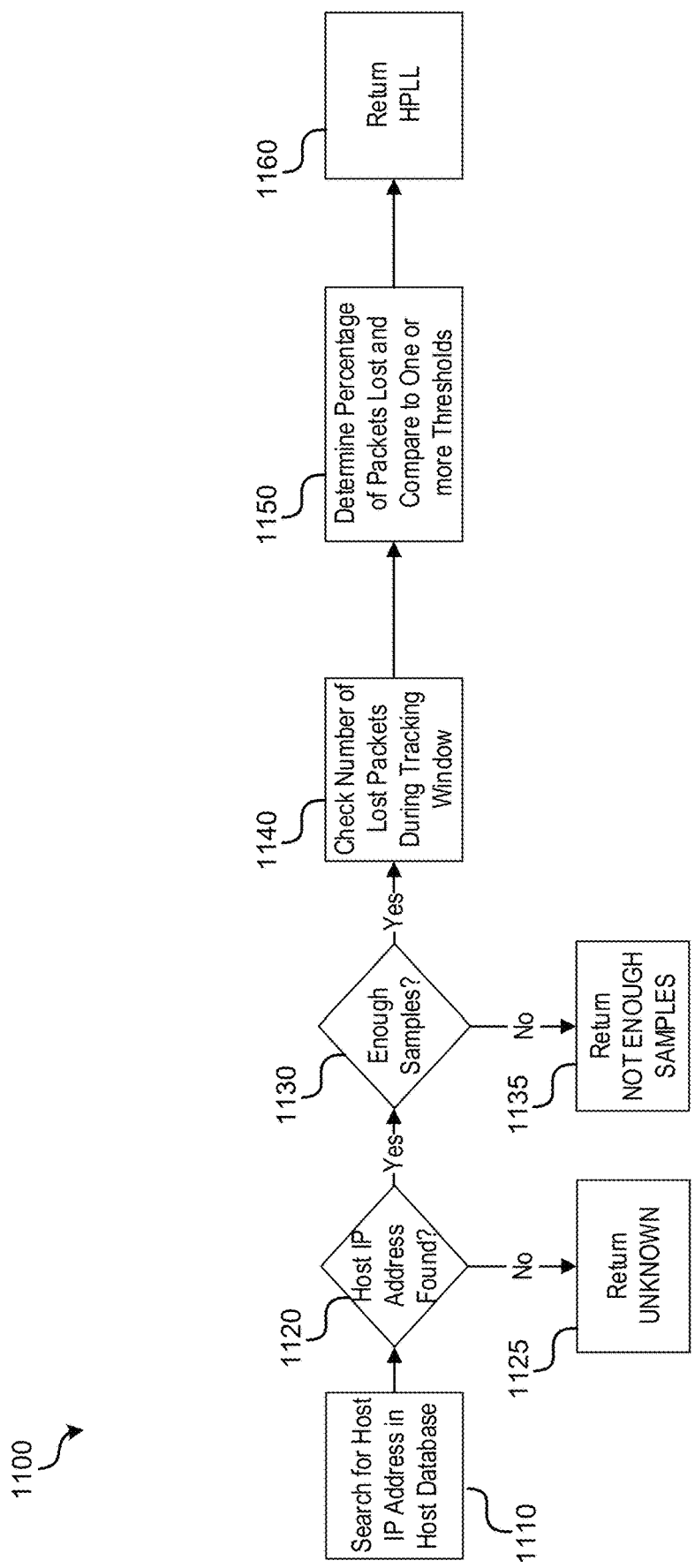
FIG. 11, is an operational flow diagram illustrating an example method of calculating a local host packet loss level value in accordance with embodiments.

FIG. 11, is an operational flow diagram illustrating an example method 1100 of calculating a HPLL. Prior to implementing method 900 TCP Spoofer 320 may receive an IP message including a TCP segment from a local host, determine an IP Address of the local host (and optionally, the remote host), and query HCM 330 for the HPLL value of the local host. At operation 1110, the HCM Module 330 may search for the host IP Address in a database. If the local host IP Address is not found (decision 1120), HCM 330 may return an Unknown value. Otherwise, if the host IP address is found (decision 1120), at decision 1130 HCM 330 may determine if there are sufficient packet loss samples (i.e., a sufficient number of packet loss measurements have been for the host over the tracking window). In implementations, a configurable, minimum number of packet loss measurements within a tracking window (e.g., the tracking window illustrated by FIG. 7) may be required to calculate a valid HPLL. If fewer than the minimum number of packet loss measurements have been seen for the local host within the tracking window, at operation 1135 a Not Enough Samples HPLL value for the host may be returned.

Otherwise, at operation 1140, a number of packets lost during the tracking window is checked (e.g., by examining the host's tracking control block corresponding to the tracking window). Alternatively, in implementations where CWX events are tracked, a number of CWX events is checked.

At operation 1150, the HPLL value may be determined by determining a percentage of packets lost during the tracking window (i.e., dividing the number of lost packets by the number of total transmitted packets) and comparing the result to one or more thresholds. Alternatively, in implementations where CWX events are tracked, the number of CWX events may be divided by the number of measurement samples and checked against one or more thresholds. At operation 1160, the HPPL is returned by HCM 330 to TCP Spoofer 320.

In one particular embodiment, the percentage of packets lost (or CWX events) may checked against two thresholds: a Packet Loss Low-Medium (PLLM) threshold and a Packet Loss Medium-High (PLMH) threshold. In this embodiment, the packet loss range may divided into three levels: Low, Medium and High, and the level matched is the returned HPLL as illustrated by Equation (2) below.

$$HPLL = \begin{cases} \text{None} & \text{if } PLL = 0 \\ \text{Low} & \text{if } 0 < PLL <= PLLM \\ \text{Medium} & \text{if } PLLM < PLL <= PLMH \\ \text{High} & \text{if } PLMH < PLL \end{cases} \quad (2)$$

-continued where $$PLL = \frac{\text{Total Number of Packets Lost}}{\text{Total Number of Packets } Tx};$$
$$PLLM < PLMH;$$

Table 4, below, illustrates an example range of HCM configuration parameters, as described above, that may be used in particular implementations of the spoofing technology disclosed herein. As previously discussed, host tracking may be controlled by two "tracking level" parameters, one for application types and one for packet loss. In implementations, tracking may be enabled even if no classifier rules include host characteristic conditions. This may be done, for example, to capture detailed per host application type statistics. This feature can be disabled altogether by setting both tracking levels to None. In this implementation, any queries made by the TCP spoofer may be responded to with Unknown for both the RDHAT and HPLL values. The HCM may only track a particular host type (local versus remote) if at least one of the tracking levels requires it.

Figure 12:
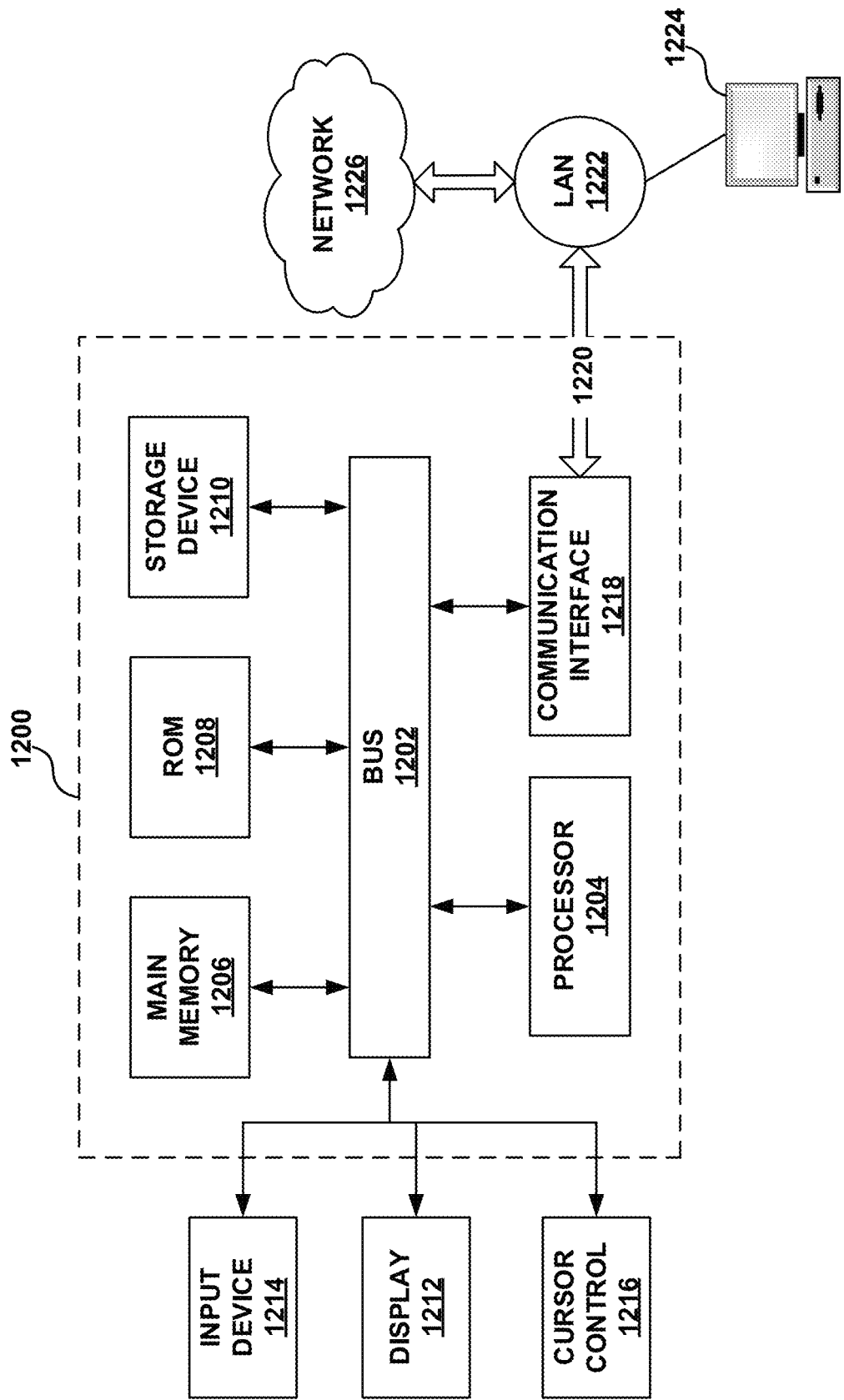
FIG. 12 illustrates an example computing module that may be used in implementing features of various embodiments.

FIG. 12 illustrates a computer system 1200 upon which example embodiments according to the present disclosure can be implemented. Computer system 1200 can include a bus 1202 or other communication mechanism for communicating information, and a processor 1204 coupled to bus 1202 for processing information. Computer system 1200 may also include main memory 1206, such as a random access memory (RAM) or other dynamic storage device, coupled to bus 1202 for storing information and instructions to be executed by processor 1204. Main memory 1206 can also be used for storing temporary variables or other intermediate information during execution of instructions to be executed by processor 1204. Computer system 1200 may further include a read only memory (ROM) 1208 or other static storage device coupled to bus 1202 for storing static information and instructions for processor 1204. A storage device 1210, such as a magnetic disk or optical disk, may additionally be coupled to bus 1202 for storing information and instructions.

Computer system 1200 can be coupled via bus 1202 to a display 1212, such as a cathode ray tube (CRT), liquid crystal display (LCD), active matrix display, light emitting diode (LED)/organic LED (OLED) display, digital light

TABLE 4

HCM Configuration Parameters

| Parameter | Description | Units | Range | Default Value |
|---|---|---|---|---|
| Application Type Tracking Level | Indicates for which hosts application types are being tracked. Queries for a type of host not being tracked will always be responded to with Unknown. | Enumerated Type | 0 - None<br>1 - Local Only<br>2 - Remote (Internet) Only<br>3 - Both Local and Remote | 1 |
| Packet Loss Tracking Level | Indicates for which hosts packet loss is being tracked. Queries for a type of host not being tracked will always be responded to with Unknown. | Enumerated Type | 0 - None<br>1 - Local Only | 1 |
| Minimum Application Type Samples | Minimum number of samples required to determine a dominant application for a host. | Count of TCP Connections | 1 to 65535 | 10 |
| Dominant Application Type Percentage | Percentage of TCP connections which must be of a particular application type for the application type to be considered dominant. | Per Cent | 20% to 100% | 80% |
| Minimum Packet Loss Samples | Minimum number of samples required to determine a packet loss level for a host. | Count of Packet Loss Samples | 1 to 65535 | 100 |
| Packet Loss Low-Medium Boundary | Upper boundary for the Low Packet Loss Level, inclusive. | 0.1 Per Cent | 0.1% to 99.9% | 1.0% |
| Packet Loss Medium-High Boundary | Upper boundary for the Medium Packet Loss Level, inclusive. This value must be greater than the Packet Loss Low-Medium Boundary. | 0.1 Per Cent | 0.2% to 100.0% | 5.0% |
| Local Host Tracking Bucket Size | Size (in time) for grouping the counts of various TCP connections. | Seconds | 10 to 3600 | 300 |
| Local Host Tracking Window Size | Number of Tracking Buckets over which the RDHAT and RHPLL should be calculated. | Count of Buckets | 1 to 10080 | 2 |
| Remote Host Tracking Bucket Size | Size (in time) for grouping the counts of various TCP connections. | Seconds | 10 to 3600 | 3600 |
| Remote Host Tracking Window Size | Number of Tracking Buckets over which the RDHAT should be calculated. | Count of Buckets | 1 to 10080 | 24 | processing (DLP) display, or plasma display, for displaying information to a computer user. An input device 1214, such as a keyboard including alphanumeric and other keys, may be coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212.

According to one embodiment of the disclosure, selective spoofing of TCP connections using at least spoofing resource conditions or host characteristic conditions, in accordance with example embodiments, are provided by computer system 1200 in response to processor 1204 executing an arrangement of instructions contained in main memory 1206. Such instructions can be read into main memory 1206 from another computer-readable medium, such as storage device 1210. Execution of the arrangement of instructions contained in main memory 1206 causes processor 1204 to perform one or more processes described herein. One or more processors in a multi-processing arrangement may also be employed to execute the instructions contained in main memory 1206. In alternative embodiments, hard-wired circuitry is used in place of or in combination with software instructions to implement various embodiments. Thus, embodiments described in the present disclosure are not limited to any specific combination of hardware circuitry and software.

Computer system 1200 may also include a communication interface 1218 coupled to bus 1202. Communication interface 1218 can provide a two-way data communication coupling to a network link 1220 connected to a local network 1222. By way of example, communication interface 1218 may be a digital subscriber line (DSL) card or modem, an integrated services digital network (ISDN) card, a cable modem, or a telephone modem to provide a data communication connection to a corresponding type of telephone line. As another example, communication interface 1218 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1218 sends and receives electrical, electromagnetic, or optical signals that carry digital data streams representing various types of information. Further, communication interface 1218 may include peripheral interface devices, such as a Universal Serial Bus (USB) interface, a PCMCIA (Personal Computer Memory Card International Association) interface, etc.

Network link 1220 typically provides data communication through one or more networks to other data devices. By way of example, network link 1220 can provide a connection through local network 1222 to a host computer 1224, which has connectivity to a network 1226 (e.g. a wide area network (WAN) or the global packet data communication network now commonly referred to as the "Internet") or to data equipment operated by service provider. Local network 1222 and network 1226 may both use electrical, electromagnetic, or optical signals to convey information and instructions. The signals through the various networks and the signals on network link 1220 and through communication interface 1218, which communicate digital data with computer system 1200, are example forms of carrier waves bearing the information and instructions.

Computer system 1200 may send messages and receive data, including program code, through the network(s), network link 1220, and communication interface 1218. In the Internet example, a server (not shown) might transmit requested code belonging to an application program for implementing an embodiment of the present disclosure through network 1226, local network 1222 and communication interface 1218. Processor 1204 executes the transmitted code while being received and/or store the code in storage device 1210, or other non-volatile storage for later execution. In this manner, computer system 1200 obtains application code in the form of a carrier wave.

The term "computer-readable medium" as used herein refers to any medium that participates in providing instructions to processor 1204 for execution. Such a medium may take many forms, including but not limited to non-volatile media, volatile media, and transmission media. Non-volatile media include, for example, optical or magnetic disks, such as storage device 1210. Volatile media may include dynamic memory, such as main memory 1206. Transmission media may include coaxial cables, copper wire and fiber optics, including the wires that comprise bus 1202. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 13:
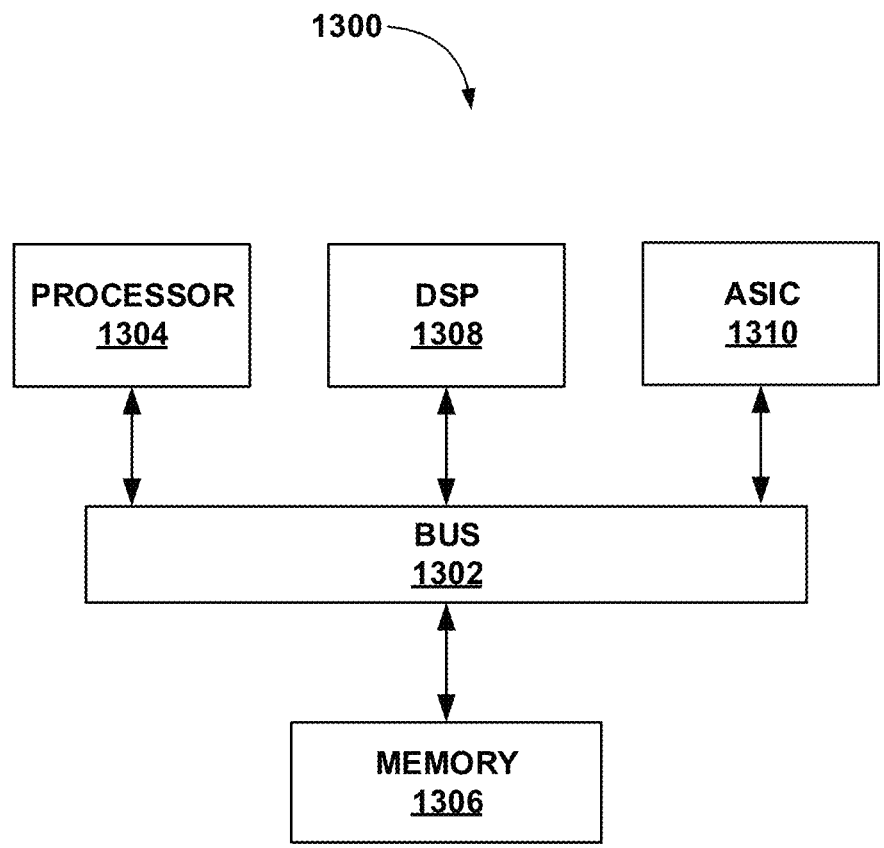
FIG. 13 illustrates an example chip set that can be utilized in implementing architectures and methods for spoofing TCP connections in accordance with various embodiments.

FIG. 13 illustrates a chip set 1300 in which embodiments of the disclosure may be implemented. Chip set 1300 can include, for instance, processor and memory components described with respect to FIG. 13 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1300 includes a communication mechanism such as a bus 1302 for passing information among the components of the chip set 1300. A processor 1304 has connectivity to bus 1302 to execute instructions and process information stored in a memory 1306. Processor 1304 includes one or more processing cores with each core configured to perform independently. A multi-core processor enables multiprocessing within a single physical package. Examples of a multi-core processor include two, four, eight, or greater numbers of processing cores. Alternatively or in addition, processor 1304 includes one or more microprocessors configured in tandem via bus 1302 to enable independent execution of instructions, pipelining, and multithreading. Processor 1304 may also be accompanied with one or more specialized components to perform certain processing functions and tasks such as one or more digital signal processors (DSP) 1308, and/or one or more application-specific integrated circuits (ASIC) 1310. DSP 1308 can typically be configured to process real-world signals (e.g., sound) in real time independently of processor 1304. Similarly, ASIC 1310 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1304 and accompanying components have connectivity to the memory 1306 via bus 1302. Memory 1306 includes both dynamic memory (e.g., RAM) and static memory (e.g., ROM) for storing executable instructions that, when executed by processor 1304, DSP 1308, and/or ASIC 1310, perform the process of example embodiments as described herein. Memory 1306 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 12. Various embodiments are described in terms of this example-computing module 500. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    receiving, at a TCP spoofer, a message from a local host including a request to initiate a TCP connection with a remote host;
    determining from the message an IP address of the local host;
    based on the determined IP address of the local host, determining: characteristics of applications in use by the local host over a time window or packet loss conditions of the local host over the time window;
    determining spoofing resource conditions of the TCP spoofer; and
    determining at the TCP spoofer whether to spoof the TCP connection from the local host to the remote host using at least:
        the determined spoofing resource conditions of the TCP spoofer; and the characteristics of applications in use by the local host over the time window or the packet loss conditions of the local host over the time window.

2. The method of claim 1, further comprising: determining spoofing resource conditions of a TCP spoofer peer associated with the remote host, wherein the determination of whether to spoof the TCP connection from the local host to the remote host uses the determined spoofing resource conditions of the TCP spoofer peer.

3. The method of claim 2, wherein determining spoofing resource conditions of the TCP spoofer and the TCP spoofer peer comprises determining a percentage of available resources in use by each of the TCP spoofer and the TCP spoofer peer.

4. The method of claim 3, wherein determining spoofing resource conditions of the TCP spoofer and the TCP spoofer peer comprises calculating an effective connection control block (CCB) resource percentage in use.

5. The method of claim 1, the method comprising determining the packet loss conditions of the local host over the time window, wherein the packet loss conditions are determined by computing a packet loss level value based on a number of packets lost by the local host during the time window divided by a total number of packets transmitted by the local host during the time window, wherein the determination of whether to spoof the TCP connection uses the packet loss level value.

6. The method of claim 1, the method comprising determining characteristics of applications in use by the local host over a time window, wherein determining characteristics of applications in use by the local host over the time window comprises classifying each TCP connection application type seen for the local host over the time window and counting a number of application types of each TCP connection application type seen.

7. The method of claim 6, wherein determining characteristics of applications in use by the local host over the time window further comprises: determining a most frequently used application type by the local host over the time window.

8. The method of claim 7, further comprising:
determining from the message an IP address of the remote host; and
based on the determined IP address of the remote host, determining characteristics of applications in use by the remote host over a time window.

9. The method of claim 8, wherein determining characteristics of applications in use by the remote host over the time window comprises:
classifying each TCP connection application type seen for the remote host over the time window;
counting a number of application types of each TCP connection application type seen for the remote host; and
determining a most frequently used application type by the remote host over the time window.

10. The method of claim 1, further comprising: spoofing the TCP connection, including the three-way handshake of the TCP connection.

11. The method of claim 1, further comprising: spoofing the TCP connection, not including the three-way handshake of the TCP connection.

12. The method of claim 1, further comprising:
making a determination that the TCP connection should not be spoofed using at least the determined spoofing resource conditions of the TCP spoofer and TCP spoofer peer; and
forwarding the TCP connection unspoofed.

13. The method of claim 2, wherein the TCP spoofer and TCP spoofer peer are each a component of a satellite terminal or an IP Gateway.

14. The method of claim 13, wherein the remote host is an internet host.

15. A system, comprising:
one or more non-transitory computer-readable mediums having instructions stored thereon that, when executed by one or more processors, cause the system to:
receive, at a TCP spoofer, a message from a local host including a request to initiate a TCP connection with a remote host;
determine from the message an IP address of the local host;
based on the determined IP address of the local host, determine: characteristics of applications in use by the local host over a time window or packet loss conditions of the local host over the time window;
determine spoofing resource conditions of the TCP spoofer; and
determine at the TCP spoofer whether to spoof the TCP connection from the local host to the remote host using at least:
the determined spoofing resource conditions of the TCP spoofer; and
at least one of the characteristics of applications in use by the local host over the time window or the packet loss conditions of the local host over the time window.

16. The system of claim 15, wherein the instructions, when executed by the one or more processors, further cause the system to: determine spoofing resource conditions of a TCP spoofer peer associated with the remote host, wherein the determination of whether to spoof the TCP connection from the local host to the remote host uses the determined spoofing resource conditions of the TCP spoofer peer.

17. The system of claim 16, wherein determining spoofing resource conditions of the TCP spoofer and the TCP spoofer peer comprises determining a percentage of available resources in use by each of the TCP spoofer and the TCP spoofer peer.

18. The system of claim 17, wherein determining spoofing resource conditions of the TCP spoofer and the TCP spoofer peer comprises calculating an effective connection control bock (CCB) resource percentage in use.

19. The system of claim 15, wherein the instructions, when executed by the one or more processors, cause the system to determine the packet loss conditions of the local host over the time window, wherein the packet loss conditions are determined by computing a packet loss level value based on a number of packets lost by the local host during the time window divided by a total number of packets transmitted by the local host during the time window, wherein the determination of whether to spoof the TCP connection uses the packet loss level value.

20. The system of claim 15 wherein the instructions, when executed by the one or more processors, cause the system to determine characteristics of applications in use by the local host over a time window, wherein determining characteristics of applications in use by the local host over the time window comprises classifying each TCP connection application type seen for the local host over the time window and counting a number of application types of each TCP connection application type seen.

21. The system of claim 20, wherein determining characteristics of applications in use by the local host over the time window further comprises: determining a most frequently used application type by the local host over the time window.

22. The system of claim 21, wherein the instructions, when executed by the one or more processors, cause the system to:
   determine from the message an IP address of the remote host; and
   based on the determined IP address of the remote host, determining characteristics of applications in use by the remote host over a time window.

23. The system of claim 22, wherein determining characteristics of applications in use by the remote host over the time window comprises:
   classifying each TCP connection application type seen for the remote host over the time window;
   counting a number of application types of each TCP connection application type seen for the remote host; and
   determining a most frequently used application type by the remote host over the time window.

24. The system of claim 15, wherein the system comprises a satellite terminal comprising the one or more non-transitory computer-readable mediums.

25. The system of claim 15, wherein the system comprises an IP Gateway comprising the one or more non-transitory computer-readable mediums.

26. A method, comprising:
   receiving, at a TCP spoofer, a message from a local host including a request to initiate a TCP connection with a remote host;
   determining spoofing resource conditions of the TCP spoofer;
   determining spoofing resource conditions of a TCP spoofer peer associated with the remote host; and
   determining at the TCP spoofer whether to spoof the TCP connection from the local host to the remote host by querying a plurality of spoofing rules, wherein a first of the queried spoofing rules includes a first condition that allows spoofing for the TCP connection only if an amount of spoofing memory resources in use falls below or does not exceed a first predetermined threshold, wherein a second of the queried spoofing rules includes a second condition that allows spoofing for the TCP connection only if the amount of spoofing memory resources in use falls below or does not exceed a second predetermined threshold different from the first predetermined threshold, wherein the amount of spoofing memory resources in use is calculated using the determined spoofing resource conditions of the TCP spoofer and the TCP spoofer peer.

27. The method of claim 26, wherein the amount of spoofing memory resources in use is calculated by determining a percentage of available resources in use by each of the TCP spoofer and the TCP spoofer peer.

28. The method of claim 27, wherein the amount of spoofing memory resources in use is calculated by determining a percentage of available buffer space in use by each of the TCP spoofer and the TCP spoofer peer.

29. The method of claim 27, wherein the amount of spoofing memory resources in use is calculated by determining a percentage of available connection control blocks (CCB) in use by each of the TCP spoofer and the TCP spoofer peer.

30. The method of claim 29, wherein the amount of spoofing memory resources in use is calculated by calculating an effective CCB resource percentage in use, wherein the effective CCB resource percentage in use is calculated based on:

$$CR_{CCB} = \text{Minimum}(\text{Maximum}((w_{SPOOFER} * pCCB_{SPOOFER}), (w_{PEER} * pCCB_{PEER})), 100),$$

Where $CR_{CCB}$ is the effective CCB resource percentage in use, $pCCB_{SPOOFER}$ is the instantaneous percent of CCBs in use in a device associated with a TCP Spoofer, $pCCB_{PEER}$ is the percent of CCBs in use in the TCP Spoofer Peer, $w_{SPOOFER}$ is a weight used to adjust the percent of CCBs in use in the TCP Spoofer; and $w_{PEER}$ is a weight used to adjust the percent of CCBs in use in the TCP Spoofer Peer.

31. The method of claim 27, wherein the TCP spoofer is a component of a satellite terminal and the TCP spoofer peer is a component of an IP Gateway.

32. The method of claim 31, wherein determining spoofing resource conditions of the TCP spoofer peer comprises receiving a packet multicast by the IP Gateway, wherein the packet comprises information on the IP Gateway's resource usage.

33. The method of claim 27, wherein the TCP spoofer is a component of an IP Gateway and the TCP spoofer peer is a component of a satellite terminal.

34. The method of claim 26, wherein at least one of the first and second queried spoofing rules specifies a condition under which spoofing is permitted for a particular TCP port or TCP application.

35. A method, comprising:
   receiving, at a TCP spoofer, an IP message from a local host including a request to initiate a TCP connection with a remote host;
   determining from the IP message an IP address of the local host and an IP address of the remote host;
   based on the determined IP address of the local host, determining characteristics of applications in use by the local host over a first time window;
   based on the determine IP address of the remote host, determining characteristics of applications in use by the remote host over a second time window; and
   determining at the TCP spoofer whether to spoof the TCP connection from the local host to the remote host by querying a plurality of spoofing rules, wherein at least one of the queried spoofing rules includes a condition based on the determined characteristics of applications in use by the local host over the first time window and the determined characteristics of applications in use by the remote host over the second time window.

36. The method of claim 35, wherein determining characteristics of applications in use by the local host over a first time window comprises classifying each TCP connection application type seen for the local host over the first time window and counting a number of application types of each TCP connection application type seen over the first time window.

37. The method of claim 36, wherein determining characteristics of applications in use by the local host over the first time window comprises querying a database for statistics tracking the number of application types of each TCP connection application type seen for the local host over the first time window.

38. The method of claim 36, wherein determining characteristics of applications in use by the local host over the time window further comprises: determining a most frequently used application type by the local host over the first time window.

39. The method of claim 38, wherein determining characteristics of applications in use by the local host over the time window further comprises: prior to determining a most frequently used application type by the local host over the first time window, determining that a number of application type samples over the first time window is greater than a threshold.

40. The method of claim 37, wherein determining characteristics of applications in use by the remote host over the second time window comprises:
   classifying each TCP connection application type seen for the remote host over the second time window;
   counting a number of application types of each TCP connection application type seen for the remote host over the second time window; and
   determining a most frequently used application type by the remote host over the second time window.

41. The method of claim 40, further comprising: selecting between the most frequently used application type by the local host and the most frequently used application type by the remote host.

42. The method of claim 35, wherein the TCP spoofer is a component of a satellite terminal and wherein the remote host is an internet host.

43. The method of claim 35, wherein the TCP spoofer is a component of an IP Gateway.

44. A system, comprising:
   one or more non-transitory computer-readable mediums having instructions stored thereon that, when executed by one or more processors, cause the system to:
      receive, at a TCP spoofer, a message from a local host including a request to initiate a TCP connection with a remote host;
      determine spoofing resource conditions of the TCP spoofer;
      determine spoofing resource conditions of a TCP spoofer peer associated with the remote host; and
      determine at the TCP spoofer whether to spoof the TCP connection from the local host to the remote host by querying a plurality of spoofing rules, wherein a first of the queried spoofing rules includes a first condition that allows spoofing for the TCP connection only if an amount of spoofing memory resources in use falls below or does not exceed a first predetermined threshold, wherein a second of the queried spoofing rules includes a second condition that allows spoofing for the TCP connection only if the amount of spoofing memory resources in use falls below or does not exceed a second predetermined threshold different from the first predetermined threshold, wherein the amount of spoofing memory resources in use is calculated using the determined spoofing resource conditions of the TCP spoofer and the TCP spoofer peer.

45. The system of claim 44, wherein the amount of spoofing memory resources in use is calculated by determining a percentage of available resources in use by each of the TCP spoofer and the TCP spoofer peer.

46. The system of claim 45, wherein the amount of spoofing memory resources in use is calculated by determining a percentage of available buffer space in use by each of the TCP spoofer and the TCP spoofer peer.

47. The system of claim 45, wherein the amount of spoofing memory resources in use is calculated by determining a percentage of available connection control blocks (CCB) in use by each of the TCP spoofer and the TCP spoofer peer.

48. The system of claim 45, wherein the TCP spoofer is a component of a satellite terminal and the TCP spoofer peer is a component of an IP Gateway.

49. The system of claim 48, wherein determining spoofing resource conditions of the TCP spoofer peer comprises receiving a packet multicast by the IP Gateway, wherein the packet comprises information on the IP Gateway's resource usage.

50. The system of claim 45, wherein the TCP spoofer is a component of an IP Gateway and the TCP spoofer peer is a component of a satellite terminal.

51. A system, comprising:
   one or more non-transitory computer-readable mediums having instructions stored thereon that, when executed by one or more processors, cause the system to:
      receive, at a TCP spoofer, an IP message from a local host including a request to initiate a TCP connection with a remote host;
      determine from the IP message an IP address of the local host and an IP address of the remote host;
      based on the determined IP address of the local host, determine characteristics of applications in use by the local host over a first time window;
      based on the determine IP address of the remote host, determine characteristics of applications in use by the remote host over a second time window; and
      determine at the TCP spoofer whether to spoof the TCP connection from the local host to the remote host by querying a plurality of spoofing rules, wherein at least one of the queried spoofing rules includes a condition based on the determined characteristics of applications in use by the local host over the first time window and the determined characteristics of applications in use by the remote host over the second time window.

52. The system of claim 51, wherein determining characteristics of applications in use by the local host over a first time window comprises classifying each TCP connection application type seen for the local host over the first time window and counting a number of application types of each TCP connection application type seen over the first time window.

53. The system of claim 52, wherein determining characteristics of applications in use by the local host over the first time window comprises querying a database for statistics tracking the number of application types of each TCP connection application type seen for the local host over the first time window.

54. The system of claim 52, wherein determining characteristics of applications in use by the local host over the time window further comprises: determining a most frequently used application type by the local host over the first time window.

55. The system of claim 54, wherein determining characteristics of applications in use by the local host over the time window further comprises: prior to determining a most frequently used application type by the local host over the first time window, determining that a number of application type samples over the first time window is greater than a threshold.

56. The system of claim 53, wherein determining characteristics of applications in use by the remote host over the second time window comprises:
   classifying each TCP connection application type seen for the remote host over the second time window;

counting a number of application types of each TCP connection application type seen for the remote host over the second time window; and determining a most frequently used application type by the remote host over the second time window.

57. The system of claim 56, wherein the instructions, when executed by the one or more processors, further cause the system to: select between the most frequently used application type by the local host and the most frequently used application type by the remote host.

58. The system of claim 51, wherein the TCP spoofer is a component of a satellite terminal and wherein the remote host is an internet host.

59. The system of claim 51, wherein the TCP spoofer is a component of an IP Gateway.

\* \* \* \* \*